United States Patent
Noack et al.

(10) Patent No.: US 9,990,714 B2
(45) Date of Patent: Jun. 5, 2018

(54) APPARATUS AND METHOD FOR GLOBAL OPTIMIZATION

(71) Applicant: SIMULA INNOVATION AS, Fornebu (NO)

(72) Inventors: Marcus M. Noack, Fornebu (NO); Simon W. Funke, Fornebu (NO)

(73) Assignee: SIMULA INNOVATION AS, Fornebu (NO)

( * ) Notice: Subject to any disclaimer, the term of this patent is extended or adjusted under 35 U.S.C. 154(b) by 77 days.

(21) Appl. No.: 15/258,775

(22) Filed: Sep. 7, 2016

(65) Prior Publication Data
US 2018/0068435 A1 Mar. 8, 2018

(51) Int. Cl.
*G06K 9/00* (2006.01)
*G06T 7/00* (2017.01)

(52) U.S. Cl.
CPC .. *G06T 7/0012* (2013.01); *G06T 2207/10004* (2013.01)

(58) Field of Classification Search
CPC ............... G06T 7/0012; G06T 7/0083; G06T 2207/30004; G06T 7/0081; G06T 2207/10116; G06T 5/40; G06T 2207/30068; G06T 7/0085; G06T 7/60; G06F 19/321; A61B 5/02007; A61B 5/7264; A61B 5/742; G06K 9/4604; G06K 9/52; G06K 9/6267; G06K 9/66
See application file for complete search history.

(56) References Cited

U.S. PATENT DOCUMENTS

| 7,200,251 | B2 * | 4/2007 | Joshi ...................... G06T 17/20 |
| | | | 382/128 |
| 7,969,444 | B1 | 6/2011 | Biermann et al. |
| 8,666,712 | B2 | 3/2014 | Bleiweiss et al. |
| 2005/0041031 | A1 | 2/2005 | Diard |
| 2010/0088035 | A1 | 4/2010 | Etgen et al. |

(Continued)

OTHER PUBLICATIONS

Ravish Mehra et al.; "An efficient GPU-based time domain solver for the acoustic wave equation", Applied Acoustics; abstract only 2011.

(Continued)

*Primary Examiner* — Duy M Dang
(74) *Attorney, Agent, or Firm* — Oblon, McClelland, Maier & Neustadt, L.L.P.

(57) ABSTRACT

An apparatus and method for computing optima of a function of a digital image. The apparatus includes circuitry configured to initialize a plurality of candidate points that lie in a solution space of the function, and computes one or more stationary points of the function. The circuitry deflates a gradient of the function at each of the one or more computed stationary points, and repeats the computing and the deflating until a first criteria is satisfied. The circuitry selects a predetermined number of fit points, recombines the selected fit points to generate a set of new candidate points, and repeats, for the set of new candidate points, the computing, the deflating, the first repeating, the selecting, and the recombining, until a second criteria is satisfied. The circuitry obtains the optima of the function upon the second criteria being satisfied, and processes the digital image based on the obtained optima.

26 Claims, 20 Drawing Sheets
(14 of 20 Drawing Sheet(s) Filed in Color)

(56) References Cited

U.S. PATENT DOCUMENTS

| | | | |
|---|---|---|---|
| 2011/0046927 | A1 | 2/2011 | Jeong et al. |
| 2011/0134132 | A1 | 6/2011 | Wolf |
| 2012/0150445 | A1 | 6/2012 | Aarre |
| 2013/0182000 | A1 | 7/2013 | Kim |
| 2014/0188393 | A1 | 7/2014 | Alkhalifah et al. |
| 2014/0278305 | A1 | 9/2014 | Jeong et al. |

OTHER PUBLICATIONS

D. Botteldooren; "Finite-difference time-domain simulation of low-frequency room acoustic problems"; The Journal of the Acoustical Society of America; 1995; abstract only.

Armen P. Zarvayan, et al.; "Shear wave elasticity imaging: a new ultrasonic technology of medical diagnostics"; Ultrasound in Medicine & Biology; 1998; abstract only.

Jon F. Claerbout; "Imaging the Earths' Interior"; 1982; abstract only.

Takumi Toshinawa, et al.; "Love-wave propagation in a three-dimensional sedimentary basin"; Bulletin of the Seismological Society of America; vol. 82, No. 4; Aug. 1992, 17 pages.

Geza Seriani, et al.; "Spectral element method for acoustic wave simulation in heterogeneous media"; Finite Elements in Analysis and Design; vol. 16; Jun. 1994; abstract only.

Heiner Igel, et al.; "Anisotropic wave propagation through finite-difference grids"; Geophysics; 1995; abstract only.

Andreas Fitchner, et al.; "Full seismic waveform modelling and inversion"; Springer; 2011; abstract only.

Paulus Micikevicius; "3D finite difference computation on GPUs using CUDA"; Proceedings of $2^{nd}$ Workshop on General Purpose Processing on Graphics Processing Units; 2009; abstract only.

Stephen P. Grand, et al.; "Global Seismic Tomography: A Snapshot of Convection in the Earth"; GSA Today; vol. 7; No. 4; 1997; 7 pages.

Scott French, et al.; "Waveform Tomography Reveals Channeled Row at the Base of the Oceanic Asthenosphere"; Science; 2013; 8 pages.

Dimitri Komatitsch, et al.; "High-order finite-element seismic wave propagation modeling with MPI on a large GPU cluster"; Journal of Computational Physics; vol. 229; issue 20; Oct. 2010; abstract only.

Kim B. Olsen. el al.; "Three-Dimensional Simulation of a Magnitude 7.75 Earthquake on the San Andreas Fault"; Science; vol. 270; Dec. 1995; 6 pages.

Tor Gillberg, et al.; "Parallel solutions of static Hamilton-Jacobi equations for simulations of geological folds"; Journal of Mathematics in Industry; 2014; abstract only.

Tor Gillberg, "Fast and accurate front propagation for simulation of geological folds Ph.D. thesis"; Faculty of Mathematics and Natural Sciences ; University of Oslo; 2013; abstract only.

\* cited by examiner

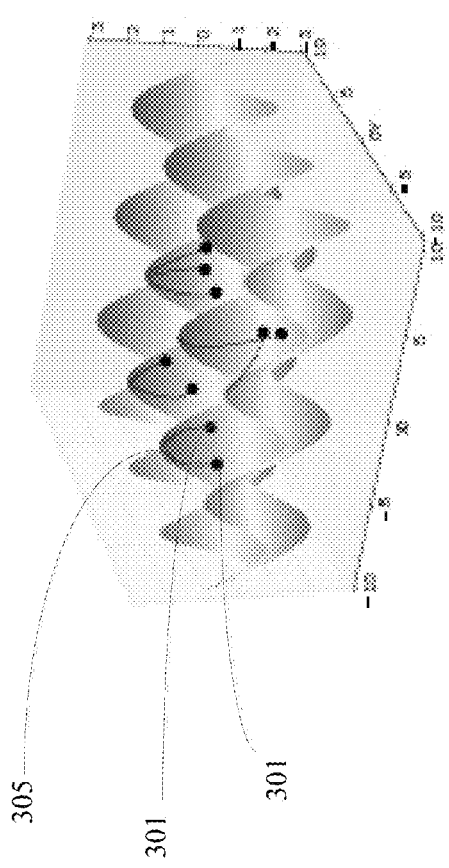
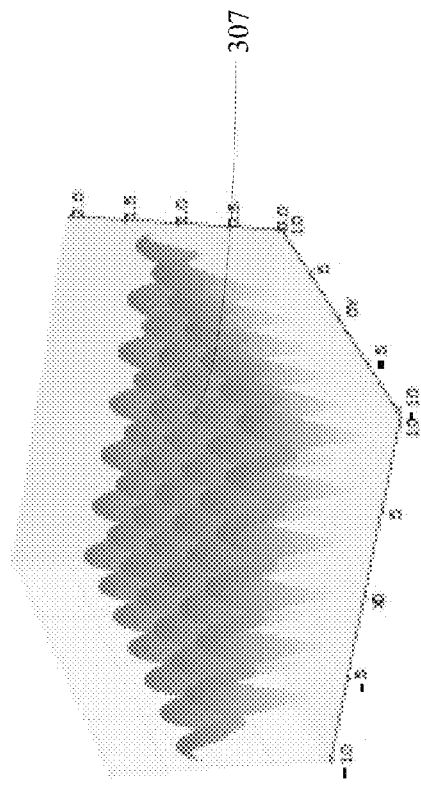
Fig. 3A
Fig. 3B

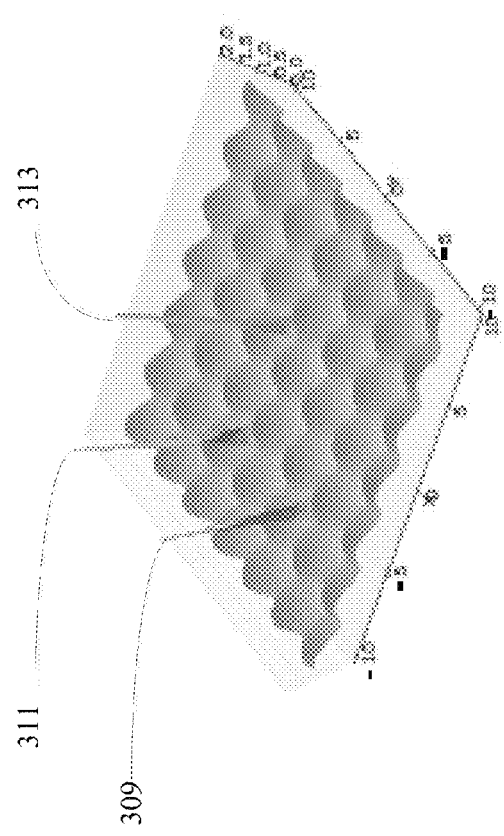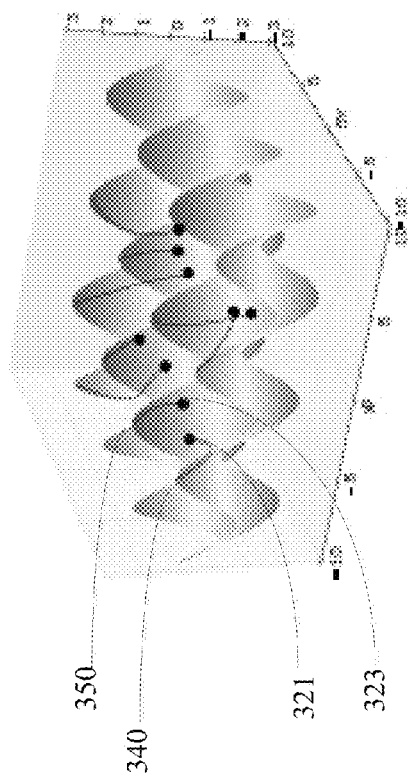
Fig. 3C
Fig. 3D

APPARATUS AND METHOD FOR GLOBAL OPTIMIZATION

BACKGROUND

Field of Disclosure

The present disclosure relates generally to a technique of optimization that reduces a number of evaluation and derivative operations that are to be performed on a function that is to be optimized. Specifically, the present disclosure relates to an optimization technique for medical image registrations.

Description of Related Art

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Optimization is a basic principle that has a vast variety of applications in research and industry. There are various optimization procedures that exhibit different strengths and weaknesses in terms of computational efficiency, and the probability of finding a global optimum. Most optimization techniques offer a trade-off between these two aspects.

Solving an optimization process may be a challenging task, as the objective function that one desires to optimize may have multiple local and global optima. Thus, having only local knowledge about the function that is obtained by evaluating derivatives of the function is not sufficient to identify whether an optimum is a local or a global optimum.

Optimization techniques can be broadly classified into two types: global optimization techniques, and local optimization techniques. The global optimization schemes incur a significant amount of function evaluations, and thus are computationally inefficient. Further, due to time-constraints, one may typically have to deal with sub-optimal solutions, while utilizing such global schemes to solve a large-sized optimization problem. On the other hand, local optimization techniques are computationally inexpensive but have a high probability of converging in a local optimum.

In order to improve the optimization efficiency, hybrid techniques have been proposed that combine the efficiency of local optimization methods with the generality of global methods. However, traditional hybrid optimization techniques do not sufficiently reduce the number of function evaluations. Specifically, based on the problem size (i.e., the solution space of the problem), these hybrid techniques still incur a significant number of function and derivative computations of the objective function due to repeated convergence in already found optima. Therefore, even though these hybrid techniques provide an improvement over the global optimization schemes, they are inefficient in terms of processing times due to the large number of function and derivative evaluations.

Accordingly, there is a requirement for an optimization technique that efficiently computes the optima of a given function in a manner such that the number of processing operations is reduced.

SUMMARY

An aspect of the present disclosure provides for an apparatus for performing digital image processing, wherein the processing includes computing optima of a function of the digital image. The apparatus comprises circuitry configured to: initialize a plurality of candidate points that lie in a parameter space of the function, each candidate point being represented by a vector having a length equal to the dimension of the parameter space, compute, based on the candidate points, one or more stationary points of the function, deflate a gradient of the function at each of the one or more computed stationary points, repeat the computing and the deflating until a first criteria is satisfied, select, from the one or more computed stationary points, a predetermined number of fit points, recombine the selected fit points to generate a set of new candidate points, repeat, for the set of new candidate points, the computing, the deflating, the first repeating, the selecting, and the recombining, until a second criteria is satisfied, obtain, the optima of the function upon the second criteria being satisfied, and process the digital image based on the obtained optima.

An aspect of the present disclosure provides a method for performing digital image processing, wherein the processing includes computing optima of a function of the digital image. The method comprises the steps of: initializing a plurality of candidate points that lie in a solution space of the function, each candidate point being represented by a vector having a length equal to the dimension of the function; computing by circuitry, based on the candidate points, one or more stationary points of the function; deflating a gradient of the function at each of the one or more computed stationary points; repeating the computing and the deflating until a first criteria is satisfied; selecting, from the one or more computed stationary points, a predetermined number of fit points; recombining by circuitry, the selected fit points to generate a set of new candidate points; repeating, for the set of new candidate points, the computing, the deflating, the first repeating, the selecting, and the recombining, until a second criteria is satisfied; obtaining, the optima of the function upon the second criteria being satisfied; and processing by circuitry, the digital image based on the obtained optima.

By one embodiment of the present disclosure is provided a non-transitory computer readable medium having stored thereon a program that when executed by a computer, causes the computer to execute a method for performing digital image processing, the processing including computing optima of a function of the digital image. The method comprises the steps of: initializing a plurality of candidate points that lie in a solution space of the function, each candidate point being represented by a vector having a length equal to the dimension of the function; computing based on the candidate points, one or more stationary points of the function; deflating a gradient of the function at each of the one or more computed stationary points; repeating the computing and the deflating until a first criteria is satisfied; selecting, from the one or more computed stationary points, a predetermined number of fit points; recombining the selected fit points to generate a set of new candidate points; repeating, for the set of new candidate points, the computing, the deflating, the first repeating, the selecting, and the recombining, until a second criteria is satisfied; obtaining, the optima of the function upon the second criteria being satisfied; and processing the digital image based on the obtained optima.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

The application file contains at least one drawing executed in color. Copies of this patent or patent application publication with color drawing(s) will be provided by the office upon request and payment of the necessary fee.

Various embodiments of this disclosure that are proposed as examples will be described in detail with reference to the following figures, wherein like numerals reference like elements, and wherein:

FIGS. 3A, 3B, 3C, and 3D depict an example illustrating the advantages incurred by performing a deflation operation;

DETAILED DESCRIPTION OF EMBODIMENTS

Figure 1:
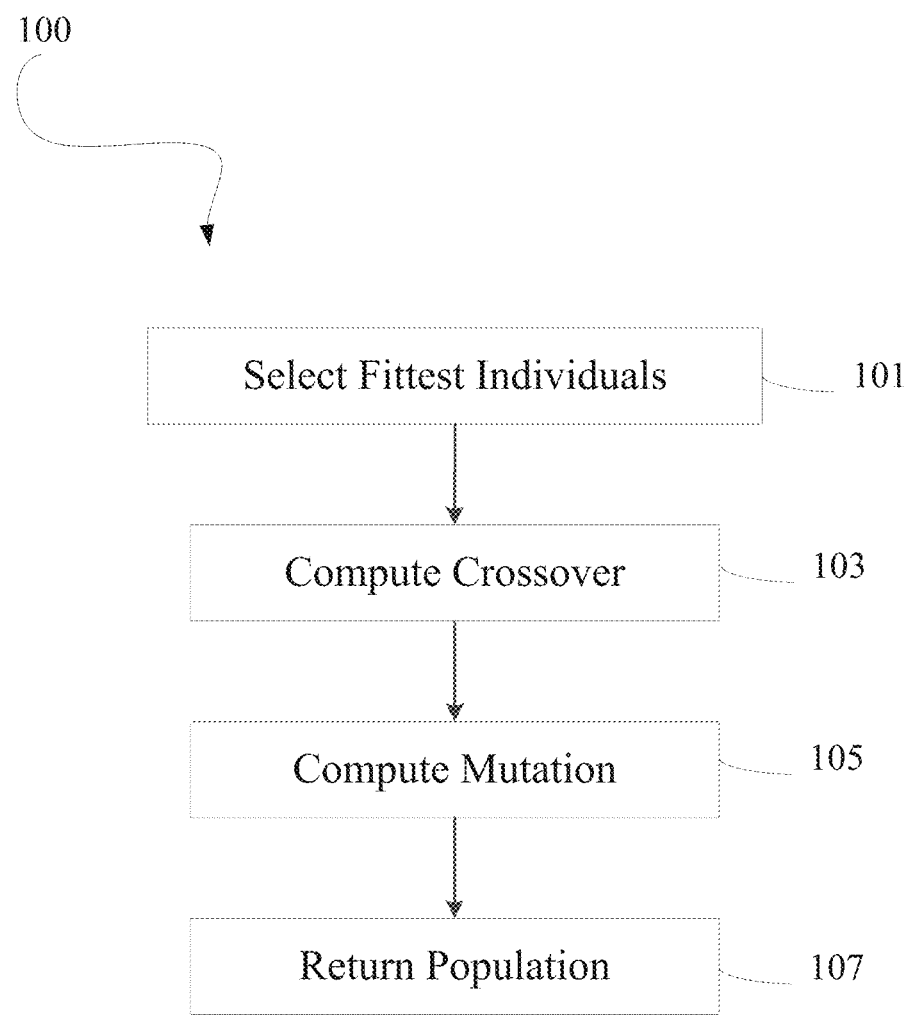
FIG. 1 depicts an exemplary flowchart illustrating the steps performed by a recombination process of a genetic algorithm.

Exemplary embodiments are illustrated in the referenced figures of the drawings. It is intended that the embodiments and figures disclosed herein are to be considered illustrative rather than restrictive. No limitation on the scope of the technology and of the claims that follow is to be imputed to the examples shown in the drawings and discussed herein.

The embodiments are mainly described in terms of particular processes and systems provided in particular implementations. However, the processes and systems will operate effectively in other implementations. Phrases such as 'an embodiment', 'one embodiment' and 'another embodiment' may refer to the same or different embodiments. The embodiments will be described with respect to methods and compositions having certain components. However, the methods and compositions may include more or less components than those shown, and variations in the arrangement and type of the components may be made without departing from the scope of the present disclosure.

The exemplary embodiments are described in the context of methods having certain steps. However, the methods and compositions operate effectively with additional steps and steps in different orders that are not inconsistent with the exemplary embodiments. Thus, the present disclosure is not intended to be limited to the embodiments shown, but is to be accorded the widest scope consistent with the principles and features described herein and as limited only by the appended claims.

Furthermore, where a range of values is provided, it is to be understood that each intervening value between an upper and lower limit of the range—and any other stated or intervening value in that stated range is encompassed within the disclosure. Where the stated range includes upper and lower limits, ranges excluding either of those limits are also included. Unless expressly stated, the terms used herein are intended to have the plain and ordinary meaning as understood by those of ordinary skill in the art. The following definitions are intended to aid the reader in understanding the present disclosure, but are not intended to vary or otherwise limit the meaning of such terms unless specifically indicated.

Optimization is one of the most fundamental principles of nature. Most physical principles can be formulated in the structure of an optimization problem. For instance, optimization can be applied to fields like medical image registration, seismic tomography, and weather prediction problems. Accordingly, it is important to develop efficient methods for optimization.

The problem of optimization can be defined as the problem of finding local and global minimizers $\{x^*\}$ of a real-valued function $f: \mathbb{R}^n \to \mathbb{R}$. Specifically, one seeks the points $x^* \in \mathbb{R}^n$ for which the following optimality condition holds:

$$f(x^*) \leq f(x) \forall x \in \mathbb{R}^n : \|x - x^*\| < r, \tag{1}$$

for a sufficiently small $r>0$. It must be appreciated that a search for maxima of the function can be expressed in a manner similar to that as shown in equation (1).

According to an embodiment, the objective function $f$ is highly non-linear. Furthermore, it is assumed that the objective function is at least twice differentiable (i.e., a second derivative of the function exists.) It must be appreciated that in many practical applications, evaluating $f$ or its derivatives involves computationally expensive operations, such as the solution of a discretized partial differential equation. As stated previously, the task of solving the problem stated in equation (1) may be numerically challenging, as the objective $f$ can have multiple local and global optima. Thus, having only local knowledge about the function, such as evaluations and derivatives, is not sufficient to identify whether an optimum is a local or a global optimum. It is for this reason that most existing optimization techniques are not applicable in optimizing such functions.

Accordingly, by one embodiment, the optimization technique of the present disclosure formulates a solution strategy that explores a global parameter space. Genetic Algorithms (GA) and Simulated Annealing (SA) techniques that are based on the fundamentals of evolution of natural processes are implemented to explore the global space as they are robust, and find the proximity of the optimal solutions eventually. Moreover, the GA and SA techniques make few assumptions of the objective function $f$, and are fully parallelizable, and can be implemented on a computer system including circuitry (described later with reference to FIG. 17).

Regarding the GA and SA techniques, it must be noted that if they are used by themselves to solve an optimization problem, the problem may incur a large number of function evaluations. For instance, in the case of the solution space of the problem being large, the GA and SA techniques may incur an unacceptable amount of processing operations. Accordingly, by one embodiment, the optimization technique of the present disclosure combines a genetic algorithm with a fast local optimization method. The algorithm is based on three components: a global search method based on the genetic algorithm, and a local search Newton method, and a deflation operation. The Newton method with deflation is referred to herein as a deflated Newton method.

The deflated Newton method efficiently identifies multiple local minima or maxima in proximity of the starting point. As a consequence, a smaller population size is sufficient to efficiently map the local and global optima of the function $f$. In doing so, the optimization method of the present disclosure incurs the advantageous ability of reducing the number of processing operations, and thereby improving the optimization performance.

By one embodiment, in the deflated Newton method, the found optima are "removed", meaning that a deflation is placed where the optimum is located. Thus, a subsequent Newton search does not converge to the same optimum, but rather finds another optimum or diverges (indicating that there are no optima located in the vicinity of the individual point). Specifically, deflation corresponds to a numerical operation that ensures that a subsequent search does not result in already found optima.

Thus, combining the global search method (e.g., the genetic algorithm) with a deflated Newton search local optimization method leads to a performance gain of the algorithm as compared to other hybrid methods. Accordingly, the combined GA-deflated Newton optimization method minimizes the required function and derivative computations in order to find the local and global optima of a function. It must be appreciated that the measure of reducing the number of computing operations is more meaningful than achieving solely, a reduction in computing time, as the computational complexity of the algorithm is highly dependent on the architecture of the computer that executed the algorithm and the forward problem.

In what follows, there is provided a detailed description of the optimization technique of the present disclosure, which includes a global search technique and the deflated Newton's local optimization process. For sake of convenience, the hybrid GA-deflated Newton optimization technique of the present disclosure is referred to hereinafter as a 'HGDN method', whereas the standard hybrid methods of combining GA with Newton based local optimization techniques are referred to herein after as Genetic-Newton methods.

Two classes of methods for optimizing functions are local methods and global methods. In most fields, the use of either local or global methods implies a trade-off between computing time and probability of finding the global optimum. Accordingly, the optimization technique of the present disclosure combines a global based optimization technique with the deflated-Newton technique for performing optimization.

Global methods, like the Monte-Carlo method or the genetic algorithm are randomized algorithms that guarantee obtaining the global optimum. The Genetic algorithm (GA) is inspired by the natural selection in biological evolution. GA is an adaptive heuristic search algorithm based on the evolutionary ideas of natural selection and genetics. As such, GA represents an intelligent exploitation of a random search used to solve optimization problems. Although randomized, the GA is by no means random. Rather, the GA exploits historical information in order to direct the search into the region of better performance within the search space. Additionally, unlike traditional artificial intelligence (AI) algorithms, the GA is more robust and does not break easily even if the inputs change slightly or there is presence of a reasonable amount of noise. Further, in searching a large state-space, multi-modal state-space, or n-dimensional surface, GA offers significant benefits over more typical search based optimization techniques such as linear programming, heuristic, depth-first, breadth-first, and praxis algorithms.

By one embodiment, GA simulates the survival of the fittest among individuals over consecutive generations for solving a problem. Each generation includes a population of character strings that are analogous to the chromosome that are observed in human DNA. Each individual represents a point in the search space and a possible solution for the optimization problem. The individuals in the population undergo a process of evolution. Specifically, GA is based on an analogy with the genetic structure and behavior of chromosomes within a population of individuals using the following foundations: (a) individuals in a population compete for resources and other individuals with whom they can combine, (b) the individuals that are most successful in each competition will produce more offspring than those individuals that perform poorly, (c) genes from good individuals propagate throughout the population so that two good parents will sometimes produce offspring that are better than either parent, and (d) each successive generation becomes more suited to the environment.

By one embodiment, in GA, a population of individuals is maintained within a search space, wherein each individual represents a possible solution to the optimization problem under consideration. For instance, each individual is coded as a finite length vector of components, or variables, in terms of some alphabet, e.g., the binary alphabet {0, 1}. The individuals correspond to chromosomes, and the variables are analogous to genes. Thus a chromosome (i.e., a potential solution) is composed of several genes (variables). A fitness score is assigned to each solution representing the abilities of an individual to 'compete'. The individual with the optimal (or generally near optimal) fitness score is sought. The GA aims to use selective 'breeding' of the solutions to produce 'offspring' better than the parents by combining information from the chromosomes.

Furthermore, GA maintains a population of n chromosomes (i.e., solutions) with associated fitness values. Parent solutions are selected to combine, on the basis of their fitness, producing offspring. Consequently, highly fit solutions are given more opportunities to combine, so that offspring inherit characteristics from each parent. Individuals in the population die (i.e., phase out) and are replaced by new solutions, eventually creating a new generation once all combination opportunities in the old population have been exhausted. In this manner, it is anticipated that over successive generations, better solutions will thrive while the least fit solutions phase out. In other words, new generations of solutions are produced containing, on average, better genes than a solution in a previous generation. Each successive generation will contain better 'partial solutions' than previous generations. Eventually, once the population has converged, and is not producing offspring noticeably different from those in previous generations, the algorithm itself converges to a set of solutions to the problem at hand.

According to one embodiment, the core of the GA includes a recombination process including a selection, a crossover, and a mutation operation as illustrated in the flowchart of FIG. 1. After an initial population is randomly generated, the recombination process evolves through a selection operation (step 101), wherein preference is given to better individuals, thereby allowing them to pass on their genes to the next generation. The goodness factor of each individual depends on its fitness value. The fitness value may be determined based on the objective function under consideration.

Further, in step 103, the recombination process performs a crossover operation. In the crossover operation, two individuals are chosen from the population using the selection operator of step 101. For instance, according to an embodiment, a crossover site along the bit strings may be chosen in a random manner. The values of the two strings can then be exchanged up to this point. For instance, if the selection operator chooses S1=000000 and s2=111111 as the two individuals on which a crossover operation is to be performed, and the crossover point is 2 then S1'=110000 and s2'=001111 are the two new offsprings that are created from this combination, and are considered for the next generation of the population. Thus, in step S103, by recombining portions of good individuals, the crossover operation is likely to create even better individuals.

The process of recombination further proceeds to step 105, wherein a mutation operation is performed. Mutation corresponds to a random change of the genome (the location) of an affected individual. Specifically, with some low probability, a portion of the new individuals can have some of their bits flipped. The purpose of performing the mutation operation is to maintain diversity within the population and inhibit premature convergence. Additionally, it must be appreciated that the mutation process as well as the chance for individuals that are not among the fittest to procreate, give the GA an unbiased behavior.

The process in step 107 returns the mutated individual to the search space.

Furthermore, note that implementing only a global optimization technique as described above may not be sufficient to solve the optimization problem in an efficient manner. Specifically, for real life applications, utilizing only the GA technique as described above may not be feasible, as the number of necessary function evaluations (i.e., processing operations) may substantially increase for a high number of dimensions of the search space. Accordingly, by one embodiment, the above GA technique is combined with a local optimization method to improve the optimization performance.

Local optimization methods are mostly derivative based methods such as a steepest descent method and a Newton local search method. Local methods are computationally inexpensive as compared to global methods, but incur a high risk of converging to a local optimum.

The Newton method computes a gradient and a Hessian at a certain point of the function and uses the computed information to predict a new location for the individual by solving the following equation:

$$H(x)\gamma = -\nabla f(x). \quad (2)$$

wherein, H is a Hessian matrix, $$H(x)_{ij} = \frac{\partial f(x)}{\partial x_i \partial x_j},$$

x is the current position and $\gamma$ is the improvement from the current to the next position. Note that the gradient of a function ($\nabla f$) is defined as the vector of the first partial derivatives of the function with respect to its variables. The Hessian matrix (or Hessian) is defined herein as a square matrix of second partial derivatives of a scalar-valued function, or scalar field.

Figure 2:
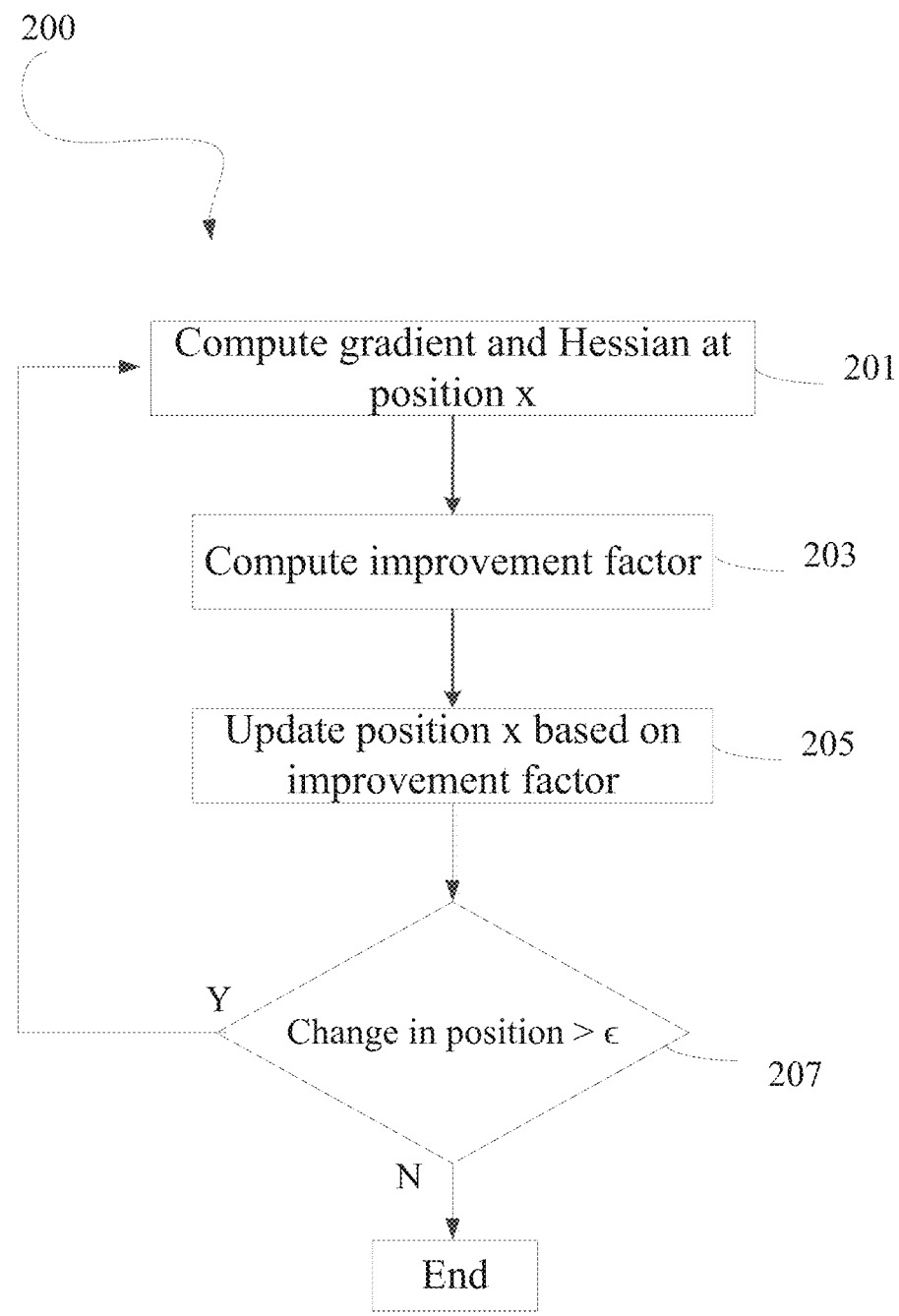
FIG. 2 depicts a flowchart illustrating the steps performed by a Newton method.

FIG. 2 depicts a flowchart illustrating the steps performed by the Newton method on a current position denoted as x.

In step 201, the process computes a gradient and Hessian at the position x.

Further, the process in step 203 solves the equation $H(x)\gamma=-\nabla f(x)$. By one embodiment, the process in step 203, may be solved by utilizing a linear solver method such as the conjugate gradient method or the minimal residual method (MINRES).

The process further proceeds to step 205 and updates the value of x (initial position) to a new position. Specifically, the new position of x is computed as x+$\gamma$. Further, in step 207, the process makes a query to determine whether a change in position is greater than a predetermined amount ($\epsilon$). If the response to the query is affirmative, the process loops back to step 201, and repeats the process of steps 201-205. However, if the response to the query in step 207 is negative, the process terminates.

The process as described with reference to FIG. 2 is successful in finding the global optimum for strictly convex functions. However, in practice, most functions that one seeks to optimize are more complicated in nature. Specifically, if a function is not convex, the Newton method may converge in a local optimum or a saddle point.

Accordingly, in an embodiment of the present disclosure, there is described a modified Newton technique (referred to herein as a deflated Newton technique), that provisions for identifying multiple local minima. The deflation process removes an identified root from a function to ensure that in a subsequent Newton step, individuals cannot find the same optimum again.

The deflated Newton technique operates as follows: the Newton optimization method searches for stationary points off, i.e. points x*, where $f'(x^*)=0$ (first derivatives of the function at x*). Let $x_1 \ldots x_N$ be stationary points that have already been identified. Then, subsequent stationary points of $f$ can be found by considering the deflated gradient of the function $f$ by using the following equation:

$$\nabla f(x) = \frac{\nabla f(x)}{\prod_{i=1}^{N} \|x - x_i\|^2} \quad (3)$$

where N is the number of deflated points. The deflated function has no roots at the known optima $x_i$, and hence the local search method will not converge to these roots again (described later with reference to FIG. 3). Thus, as described next, the optimization technique of the present disclosure implements a combination of a deflated Newton method and the GA technique.

Generally, hybrid optimization schemes combine the strengths of global and local optimization. Hybrid methods employ a global search algorithm such as GA to explore the search space on a global level, and the Newton method as a local optimization scheme. After each iteration of the GA, all individuals perform a Newton search (by the process described with reference to FIG. 2) to find a stationary point of the function. When all individuals have converged, the GA chooses the fittest individuals and creates offspring by the process described previously with reference to FIG. 1. The next generation is in general fitter than the last one which leads to the convergence of the algorithm. After a new generation is created, all individuals commence the search using the Newton scheme.

A drawback of the above described hybrid optimization methods is that the local search method might compute the same optima for different individuals. Therefore, a significant amount of computational effort is potentially utilized identifying already known optima. Also, these optima might be re-identified again (potentially multiple times) in each of the subsequent genetic iteration. Only if an individual is positioned sufficiently close to a new optimum, then the local search will converge to this new optimum.

Accordingly, in one embodiment of the present disclosure, there is provided a HGDN method that incorporates deflations, in order to perform the optimization in an efficient manner.

The HGDN scheme places a plurality of individuals randomly in the search space. Each individual implements a deflated Newton method to find a stationary point of the function. Further, the gradient of the function is deflated (described with reference to FIG. 3) at this location (i.e., stationary point), and the point is transferred to a list. When a certain number of individuals have converged, all the individuals are set back to their original locations in order to start a new search. It must be appreciated that the individuals cannot converge to the same points due to the deflation operation. The process continues until most of the individuals can no longer find a stationary point. In such a scenario, the GA relocates the population by creating offspring using the fittest individuals and the search starts again. In this manner, the HGDN method progressively identifies more stationary points. By one embodiment, the search process of the HGDN method can be terminated when no new stationary points are found, or when a certain number of new found optima show a similar function value (i.e., the function value of the new found optima are substantially the same).

FIGS. 3A-3D depict an exemplary example depicting the advantages incurred by performing the deflation operation. FIG. 3A depicts two individual points 301 and 303 that obtain the same optima point 305 after an iteration of the Newton method of finding stationary points. The process of finding the same optima point is depicted in FIG. 3A by traces that start from the points 301 and 303 respectively, and terminate at the same peak location point 305. Since the function to be optimized is not deflated, several individual points may result in finding the same optima (in an iteration of the Newton method), and thereby waste computational resources in identifying already known optima locations. Moreover, while implementing the traditional Genetic-Newton optimization method, the same optima may potentially be found in several iterations of the GA.

FIG. 3B depicts the Euclidean norm of the gradient 307 of the function of FIG. 3A. The gradient of the function can be obtained by applying the partial derivatives as stated previously. Note that the optima in the original function (FIG. 3A) are roots of the gradient function.

FIG. 3C depicts the deflation process, wherein the gradient of the function at the determined optima positions (309, 311, and 313) is deflated. The deflation is achieved by performing a numerical factorization based on a deflation operator. Details regarding deflation operators is described next.

FIG. 3D illustrates the advantages incurred by performing the deflation operation. Specifically, in FIG. 3D, the points 321 and 323 do not converge to the same optima, but rather converge to separate optima positions represented as 340 and 350, respectively. Thus, by performing deflation, already identified optima cannot be found again.

Figure 4:
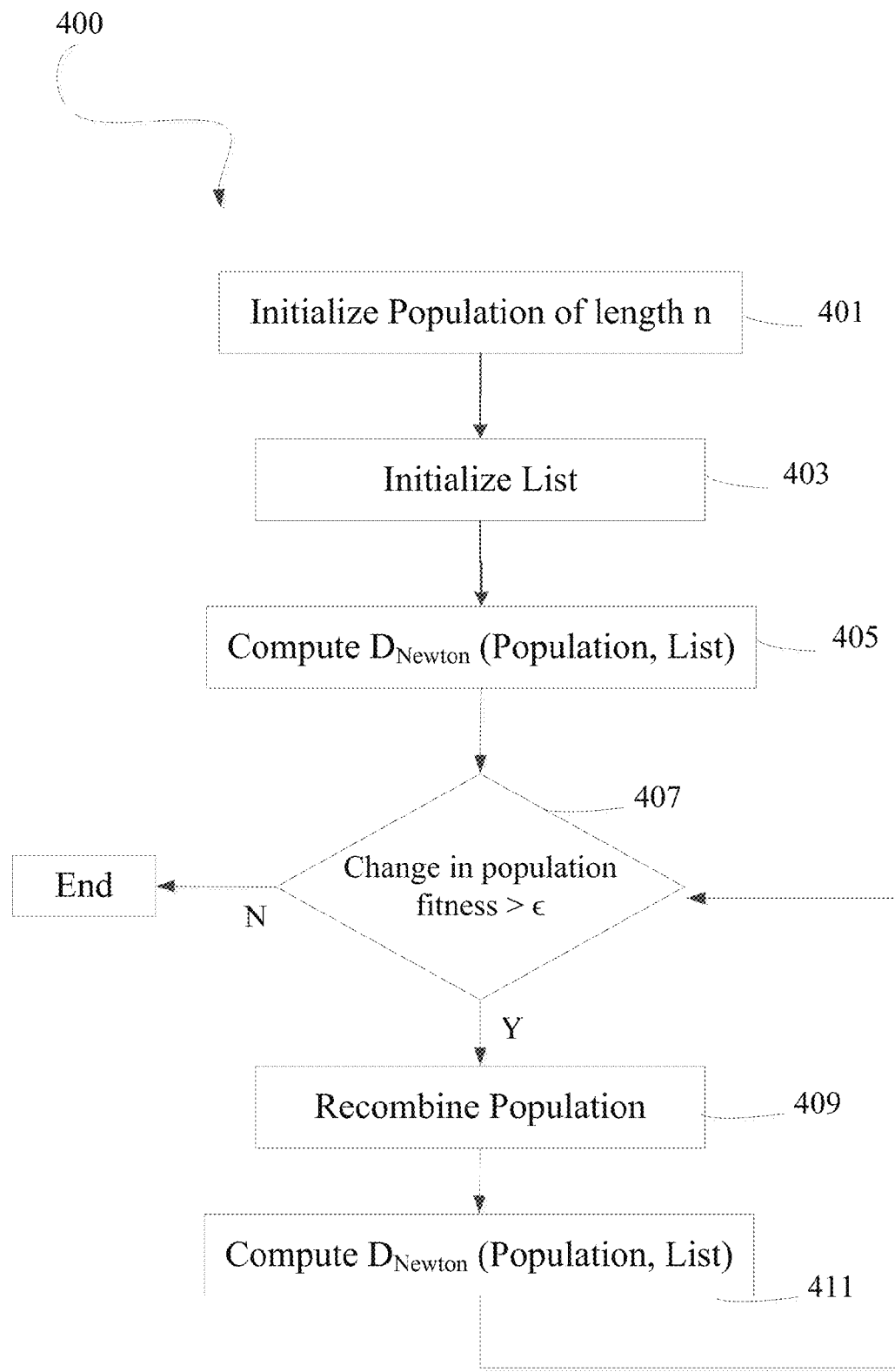
FIG. 4 depicts an exemplary flowchart illustrating the steps performed by Hybrid Genetic Deflated Newton (HGDN) algorithm.

In what follows, there is described an implementation of the HGDN algorithm by an embodiment of the present disclosure. Turning now to FIG. 4, there is depicted an exemplary flowchart 400 illustrating the steps performed by the HGDN algorithm.

In step 401, an initial population of individuals is selected. Specifically, based on the dimensions of the search space, an initial set of individuals may be selected in a random manner.

In step 403, a list that is configured to store a set of deflated points of the function to be optimized is initialized to a null list.

Further, the process in step 405 executes a deflated Newton process, which is described later with reference to FIG. 5. Note that the deflated Newton process receives as input parameters, a population of individuals that are computed (at a given iteration) by the HGDN algorithm, and the list. Further, the deflated Newton process computes a set of fittest individuals by executing a deflation mechanism, and calculating a fitness score for each individual.

In step 407, a query is made to determine whether a change in the fitness value of the population is greater than a predetermined threshold (∈). If the response to the query is negative, the process terminates, whereas if the response to the query is affirmative, the process moves to step 409.

In step 409, the HGDN process executes a recombination operation. As stated previously, with reference to FIG. 1, the recombination operation may be performed by executing a crossover and mutation operation.

Further, in step 411, the deflated Newton process is executed on the new population that is obtained via the recombination process of step 409. Thereafter, the process loops back to step 407, and repeats the process until a change in the fitness of the population is less than the predetermined threshold of ∈.

Figure 5:
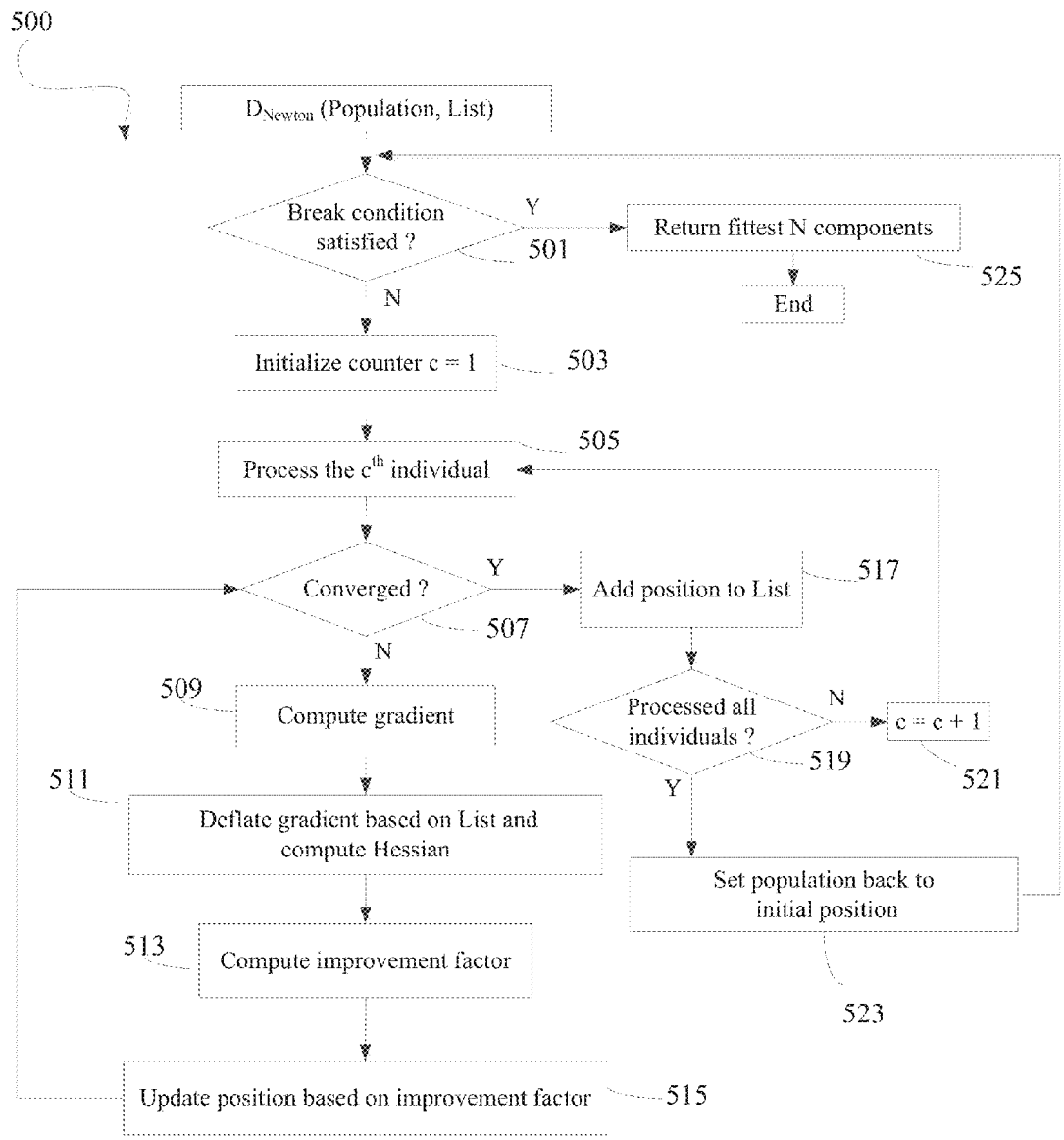
FIG. 5 depicts an exemplary flowchart illustrating the steps performed by a deflated Newton algorithm using a plurality of individuals.

FIG. 5 depicts an exemplary flowchart illustrating the steps performed by the deflated Newton process. The deflated Newton process receives, as input parameters, a population of individuals and the list that maintains the set of deflated optima.

In step 501, a query is made to determine whether a break condition for the deflated Newton process is satisfied. For instance, by one embodiment, the break condition may correspond to determining whether a certain number of individuals (e.g., a predetermined percentage of individuals) have converged. If the response to the query is affirmative, the process moves to step 525, else the process moves to step 503.

In step 503, a counter (c) for the individuals of the population to be processed is initialized to a value of one.

Thereafter, the process proceeds to step 505, wherein the processing of the $c^{th}$ individual commences. Specifically, the processing of the individual includes the steps 507-517 as described below.

In step 507, a query is made to determine whether the individual has converged to a stationary point. For instance, by one embodiment, a query is made to determine whether a change in the fitness value of the individual is greater than a predetermined threshold. In other words, a change in the fitness value being less than the predetermined threshold value corresponds to a scenario, wherein the individual has converged to the stationary point, and the process moves to step 517.

However, if the individual has not converged (i.e., No at step 507), the process moves to step 509. In step 509, the process computes the gradient of the function at the location of the individual, and proceeds to step 511.

In step 511, the gradient of the function is deflated based on the individuals maintained in the list. The process also computes the Hessian (described previously) of the function at location x. By deflating the gradient, the process guarantees that the local search will not converge to an already found optima location.

The process in step 513 solves the equation (2), i.e., $H(x)\gamma = -\nabla f(x)$ to compute the improvement factor $\gamma$. By one embodiment, the process in step 513 may be solved by utilizing one of a conjugate gradient method and a minimal residual method (MINRES).

Upon computing the improvement factor, the process in step 515 updates the value of x (initial position) to a new position. Specifically, the new position of x is computed as $x+\gamma$. Thereafter, the process loops back to step 507, wherein the process performs the query to check if the individual has converged.

Upon the individual converging to the stationary point (Yes at step 507), the process moves to step 517, wherein the converged position of the individual is added to the list. The process thereafter moves to step 519, wherein a query is made to determine whether all individuals are processed. If the response to the query at step 519 is negative, the process moves to step 521, wherein the value of the counter (c) is incremented by one. Thereafter, the process loops back to step 505 to process the next individual.

If the response to the query of step 519 is affirmative, the process proceeds to step 523, wherein the process sets the population of individuals to their original starting positions. Thereafter, the process loops back to step 501 to determine whether the breaking condition for the deflated Newton process is satisfied.

If the response to the query in step 501 is affirmative, the process moves to step 525, wherein the process outputs the values of the N (predetermined integer) fittest individuals maintained in the list, whereafter the process of FIG. 5 terminates.

Accordingly, as described above, by one embodiment, the new position of the individual is only transferred to the list if the Newton method has converged. However, if enough individuals cannot converge, the genetic algorithm replaces the entire population and the Newton starts over at the new locations.

In what follows, there is provided a description of the deflation operators that may be employed by the HGDN method of the present disclosure.

When coping with challenging optimization problems, the simple deflation strategy of equation (3) may not be numerically robust. A general version of the basic deflation operator of equation (3) for deflating a single root $x_o$ can be expressed as:

$$\nabla f x_0(x) = \frac{\nabla f(x)}{\|x - x_0\|^p} \tag{4}$$

where $p \in \mathbb{N}$. However, the application of the deflation operator of equation (4) may pose numerical problems as the deflated function converges to 0 for $x \to \infty$, if the optimization function $f$ is bounded. Subsequently, applying Newton to $fx_0$ may diverge. By one embodiment of the present disclosure, such a problem is avoided by introducing a shifting of the deflation operator as shown below:

$$\nabla f x_0(x) = \left(\frac{1}{\|x - x_0\|^p} + 1\right) \nabla f(x). \tag{5}$$

In equation (5), for the case of $x \to \infty$, the deflated function behaves as the original function. A limitation of the deflation operators of equations (4) and (5) is that they alter the function globally, which results in degeneration if the deflation is applied many times. For instance, when applying the deflation to two different roots $x_0$ and $x_1$:

$$\nabla f x_0, x_1(x) = \left(\frac{1}{\|x - x_0\|^p} + 1\right) \nabla f x_1(x) \tag{6}$$
$$= \left(\frac{1}{\|x - x_0\|^p} + 1\right)\left(\frac{1}{\|x - x_1\|^p} + 1\right) \nabla f(x).$$

The function is multiplied by a scalar coefficient that is greater than 1. Accordingly, the coefficient may quickly grow if many deflations are applied. Traditional deflation techniques, as well as shifted deflation methods, lead to an altering of the function outside a vicinity of the deflation, and are therefore numerically problematic when many deflations occur. In the case of having many deflations, the function values may fall below machine precision or grow beyond feasibility which leads to numerical problems as illustrated in FIG. 6.

Figure 6:
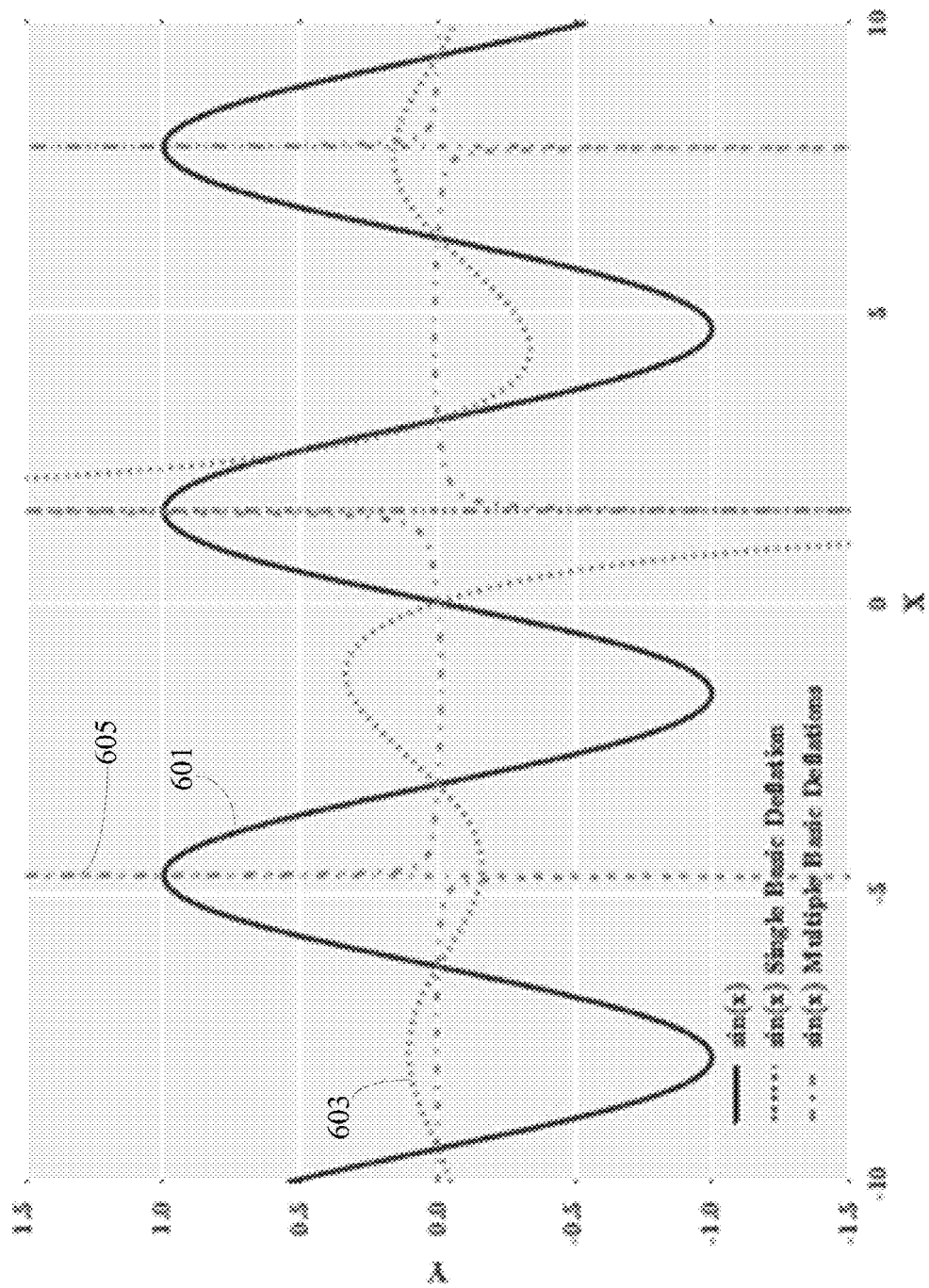
FIG. 6 depicts an exemplary graph illustrating the effect of multiple deflation operations being applied to a sine function.

FIG. 6 depicts an exemplary graph illustrating the effect of multiple deflation operations being applied to a sine function. In FIG. 6, curve 601 corresponds to a sine wave, whereas curves 603 and 605 correspond to deflated sine functions that are obtained by using the deflation operation of equation (3). Specifically, curve 603 is obtained by using a single iteration of the deflation operator, whereas curve 605 is obtained by multiple iterations of the deflation operator. Note that the function is altered everywhere when deflation is applied. The single deflated sine function (curve 603) exhibits much smaller amplitudes and presents a phase shift, as compared to curve 605, wherein the multiple deflated sine function exhibits almost no visible amplitude.

Accordingly, in one embodiment of the present disclosure, there is provided a localized deflation operator that addresses the above stated issue of having multiple deflation operations being applied to the optimization function. The localized deflation operation is a bump function (i.e., a smooth function with compact support) that affects an area close to the deflation only. The normalized bump function in n dimensions is expressed as:

$$b_{x0}(x) = \begin{cases} \prod_{i=1}^{n} \dfrac{\exp\left(\dfrac{-\alpha}{r^2 - (x_i - x_{i0})^2}\right)}{\exp\left(\dfrac{-\alpha}{r^2}\right)} & \text{if } x_{i0} - r < x_i < x_{i0} + r \\ 0 & \text{else} \end{cases} \quad (7)$$

where $x_0$ is the location of the center of the deflation, r is the radius of the deflation and $\alpha$ is a coefficient to adjust the shape of the bump function.

Figure 7A:
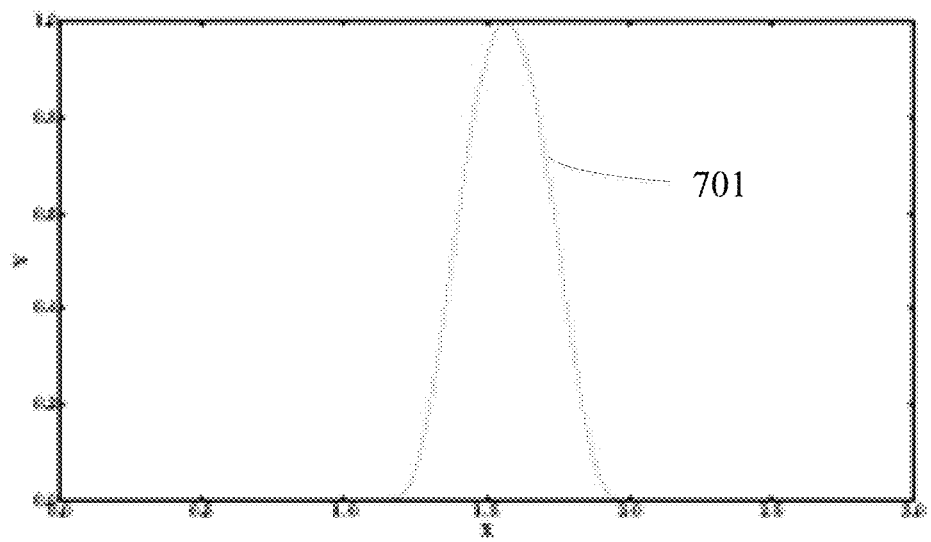
FIGS. 7A, 7B, and 7C depict exemplary bump functions and their effects on a deflated function.
Figure 7B:
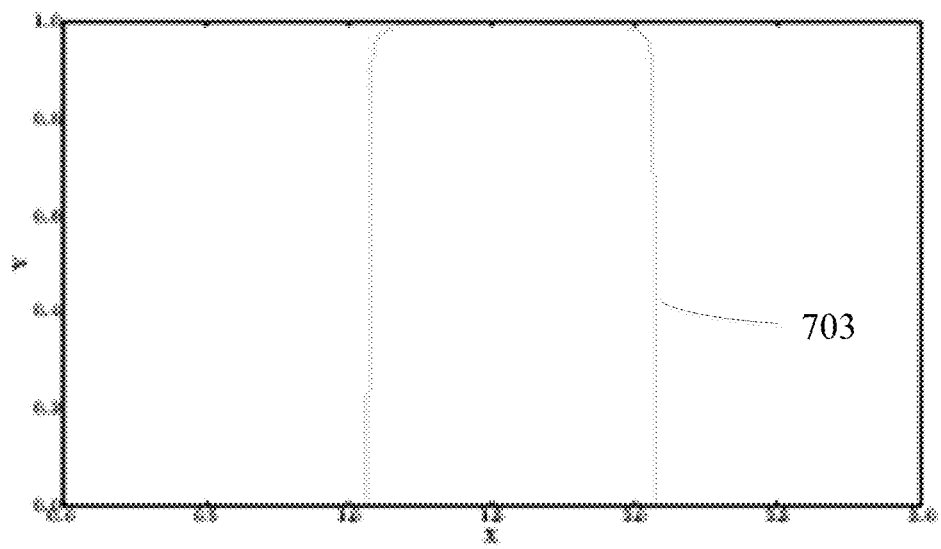
Figure 7C:
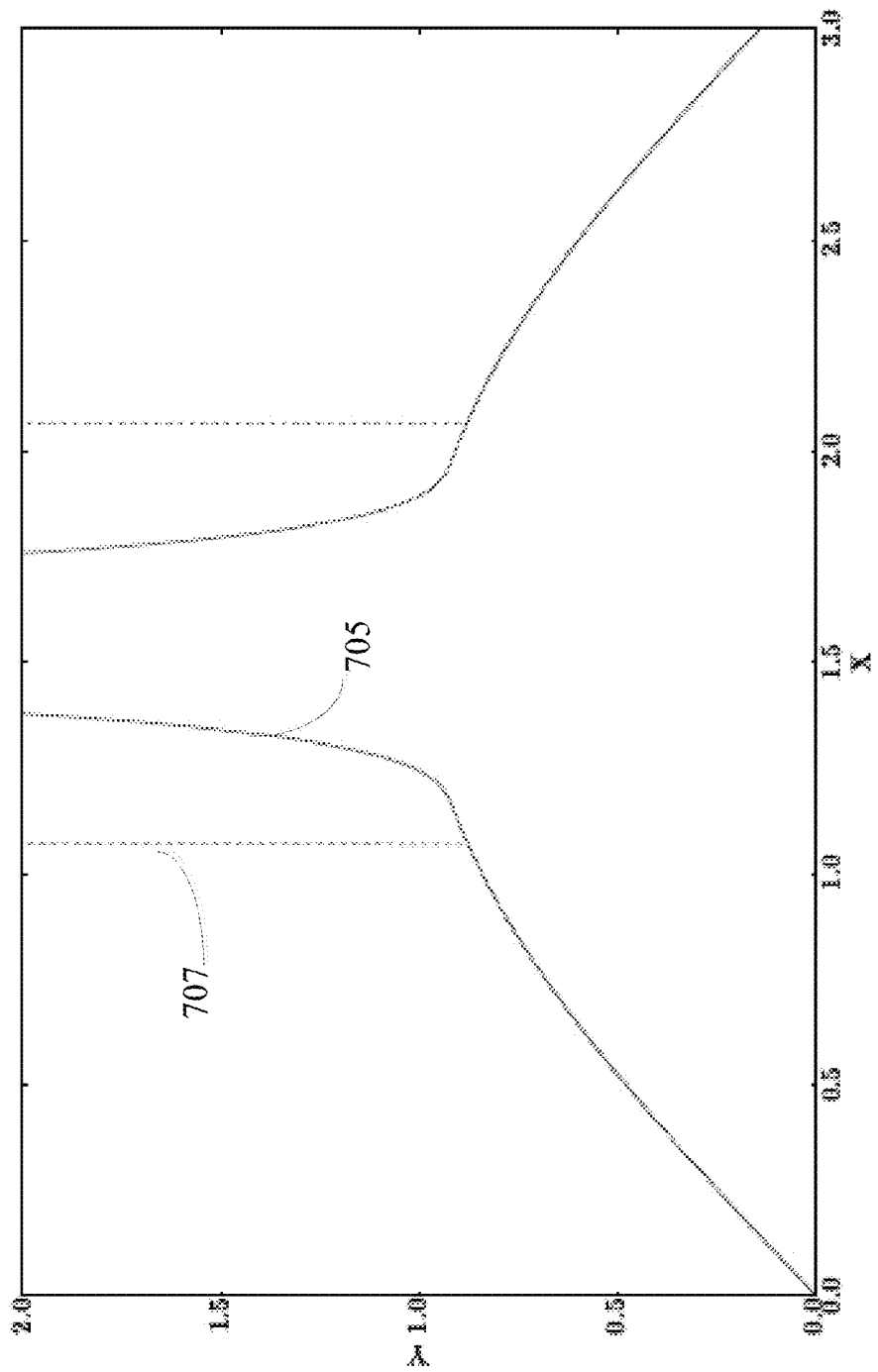

FIG. 7A-FIG. 7C depict exemplary bump functions and their effects on the deflated function. FIG. 7A depicts a bump function represented as curve 701 having a coefficient value of $\alpha=1$. FIG. 7B depicts another bump function represented by curve 703 having a coefficient value of $\alpha=0.1$. FIG. 7C depicts the effect of deflating an optimization function (i.e., a change in the deflated function) using the bump functions of FIGS. 7A and 7B, respectively. In FIG. 7C, curve 705 depicts the deflated optimization function using the bump function of FIG. 7A, whereas curve 707 (dotted curve) depicts the deflated optimization function using the bump function of FIG. 7B. It must be appreciated that the boundaries of the deflation are much more distinct (curve 707) when using lower values for $\alpha$.

According to an embodiment, an adapted shape of the bump function leads to a more efficient prevention of individuals converging into the deflated optimum. The deflated function is expressed as:

$$\nabla f_{xo}(x) = \frac{\nabla f(x)}{1 - b_{xo}(x)}. \quad (8)$$

The employment of the localized deflation with coefficient $\alpha$ provisions for obtaining highly shapeable deflations at the correct locations, without altering the optimization function elsewhere. Highly shapeable bump functions correspond to a better avoidance of the convergence of an individual in a deflated optimum in the Newton step.

Figure 8:
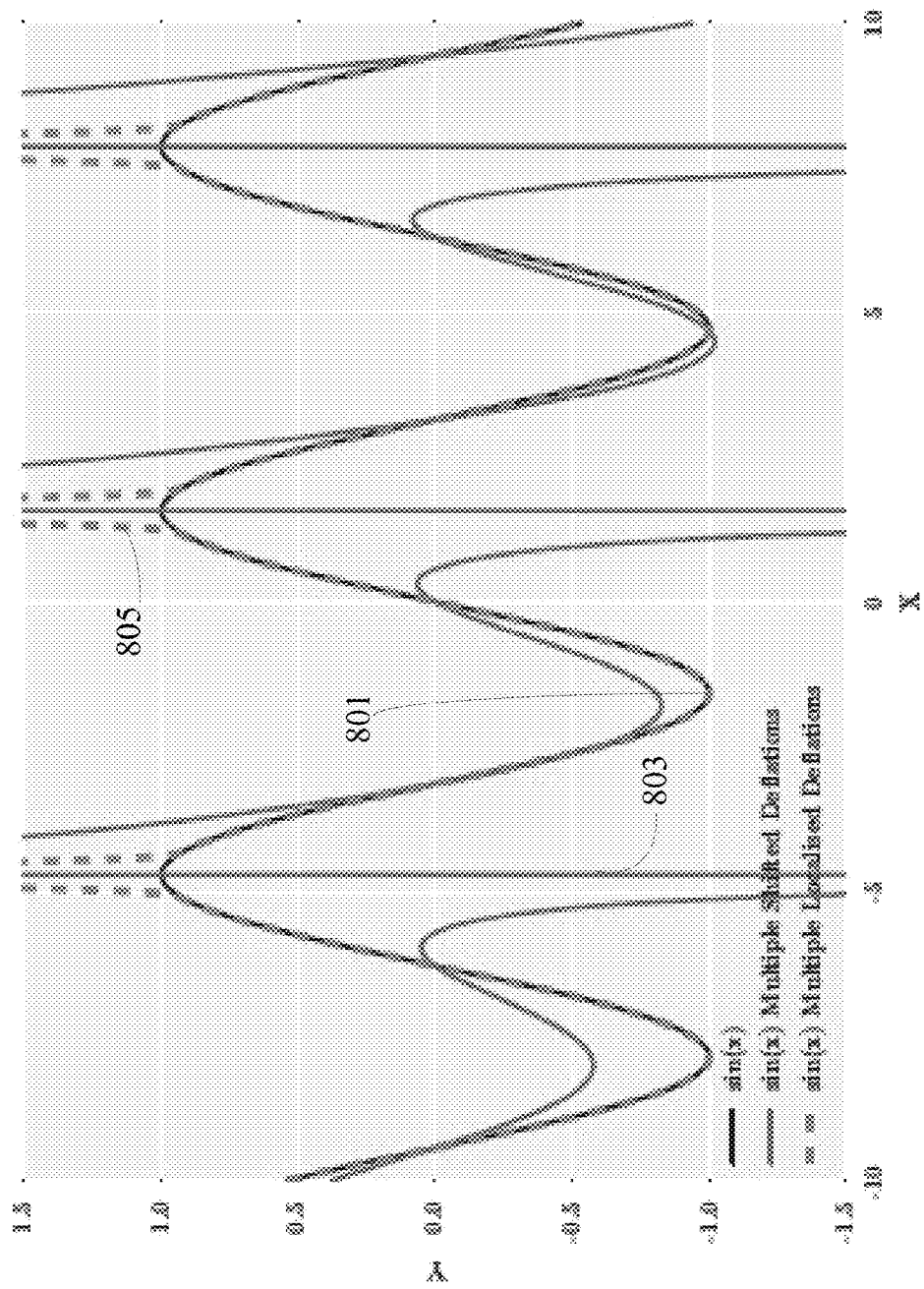
FIG. 8 depicts a graph illustrating a comparison of utilizing shifted and localized deflation operators.

FIG. 8 depicts a graph illustrating a comparison of using shifted and localized deflation operators. In FIG. 8, curve 801 depicts a sine wave function, whereas curves 803 and 805 represent the deflated sine functions obtained by utilizing shifted and localized deflation techniques. Specifically, curve 803 corresponds to a deflated sine function obtained by utilizing a shifted deflation operator, and curve 805 corresponds to deflated sine function obtained by utilizing a localized deflation operator. It must be appreciated that by applying the shifted deflation operator of equation (5) multiple times yields in changed amplitudes and a phase shift in the adjacent areas of the deflation points. In contrast, the localized deflation technique leaves the function unaffected outside a certain radius.

According to one embodiment, in order to evaluate the performance of the HGDN optimization scheme of the present disclosure, its performance is compared to the general genetic algorithm and the general hybrid genetic algorithm-Newton algorithm, referred to herein as Genetic-Newton method. The performance is compared over four standard benchmark experiments for genetic algorithm. The HGDN optimization scheme is challenged to find the global maximum of the example functions (described below) using a lower number of function and derivative evaluations as compared to a general genetic algorithm and the Genetic-Newton method.

The genetic algorithm implements a crossover which creates a child individual by using alternate genes from the parent individuals. Furthermore, in all experiments, the process of mutation is considered for one percent of the genome value and occurs with a probability of eighty percent. In order to improve the unbiased behavior of the algorithm, a second stage of mutation may occur with a probability of ten percent. Accordingly, such a mutation scheme changes the value of the genome randomly in the limits of the search space. Additionally, in the performance comparison of the algorithms, the Newton algorithm is said to converge when the change in location from one iteration to the next falls below a certain threshold.

In what follows, there is provided according to one embodiment, a detailed description of the optimization functions.

Figure 9:
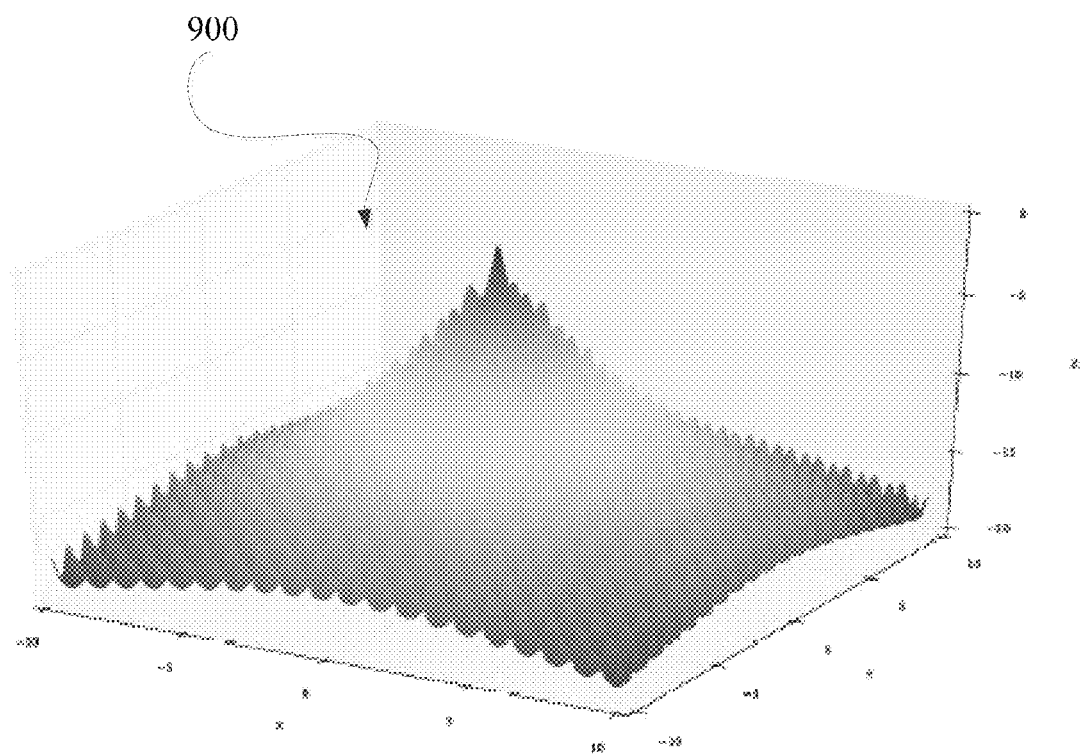
FIG. 9 depicts an exemplary illustration of Ackley's function.

FIG. 9 depicts an exemplary Ackley's function 900 that exhibits a steep guiding slope towards the global optimum which is located in the center. The function contains many local optima, which can mislead local gradient based methods in the process of finding the global optima. Ackley's function can be expressed as:

$$f(x) = 20\exp\left[-0.2\sqrt{\frac{1}{n}\sum_{i=1}^{n} x_i^2}\right] + \exp\left[\frac{1}{n}\sum_{i=1}^{n} \cos(2\pi x_i)\right] - 20 - \exp(1) \quad (9)$$

and is considered relatively easy to optimize due to the steep guiding slope giving a preferred search direction. Furthermore, Ackley's function is potentially relevant in many real world applications.

By one embodiment, in a first experiment, the goal is to optimize Ackley's function in the limits $-10 < x_i \leq 10$. The search space gives the limits of the random placement of the first generation of individuals. Ackley's function comprises many local optima which can mislead local gradient methods but shows a steep guiding slope towards the global optimum.

Figure 10:
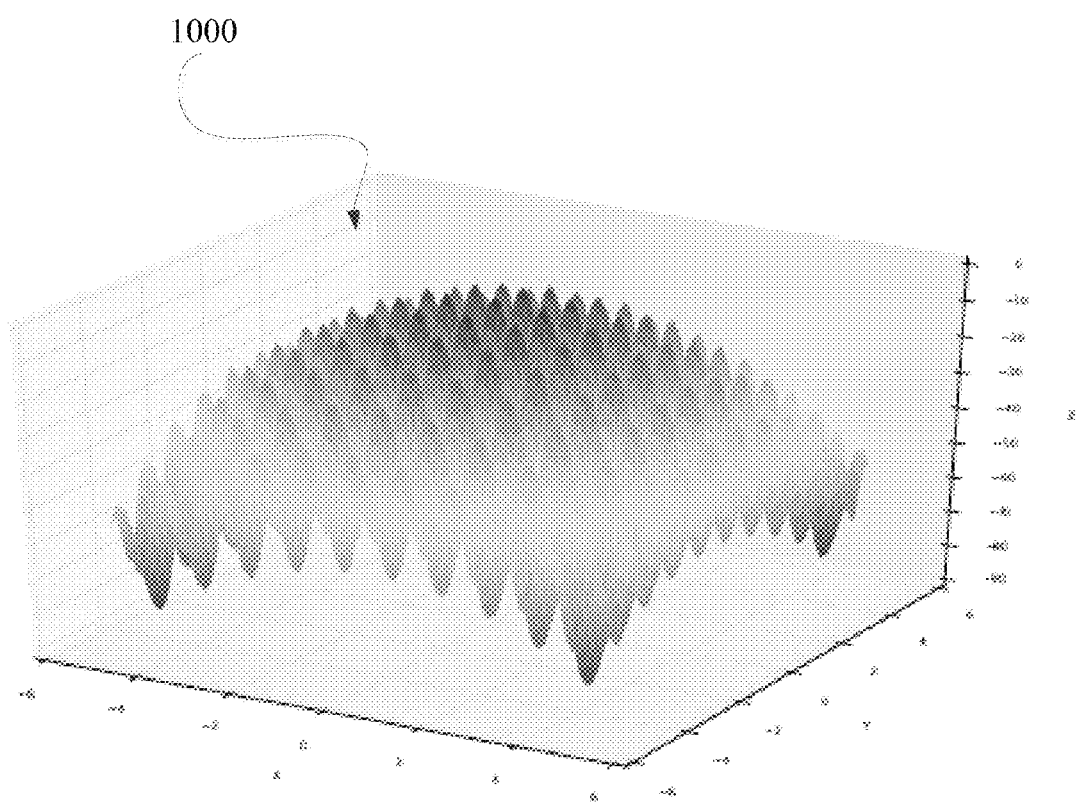
FIG. 10 depicts an exemplary illustration of Rastrigin's function.

In FIG. 10, there is depicted an exemplary Rastrigins's function 1000 that exhibits a less steep guiding slope towards the global optimum than Ackley's function of FIG. 9. The Rastrigins's function contains a plurality of optima in the search space, which can mislead local gradient based methods in finding the global optima. Rastrigins's function can be mathematically expressed as:

$$f(x) = -10n - \sum_{i}^{n} x_i^2 - 10\cos(2\pi x_i). \quad (10)$$

This function has a less steep guiding slope than Ackley's function (FIG. 9) which complicates the optimization process. On the other hand, there are less local optima in the search space $-5.12 < x_i \leq 5.12$ of the Rastrigins's function as shown in FIG. 10.

Figure 11A:
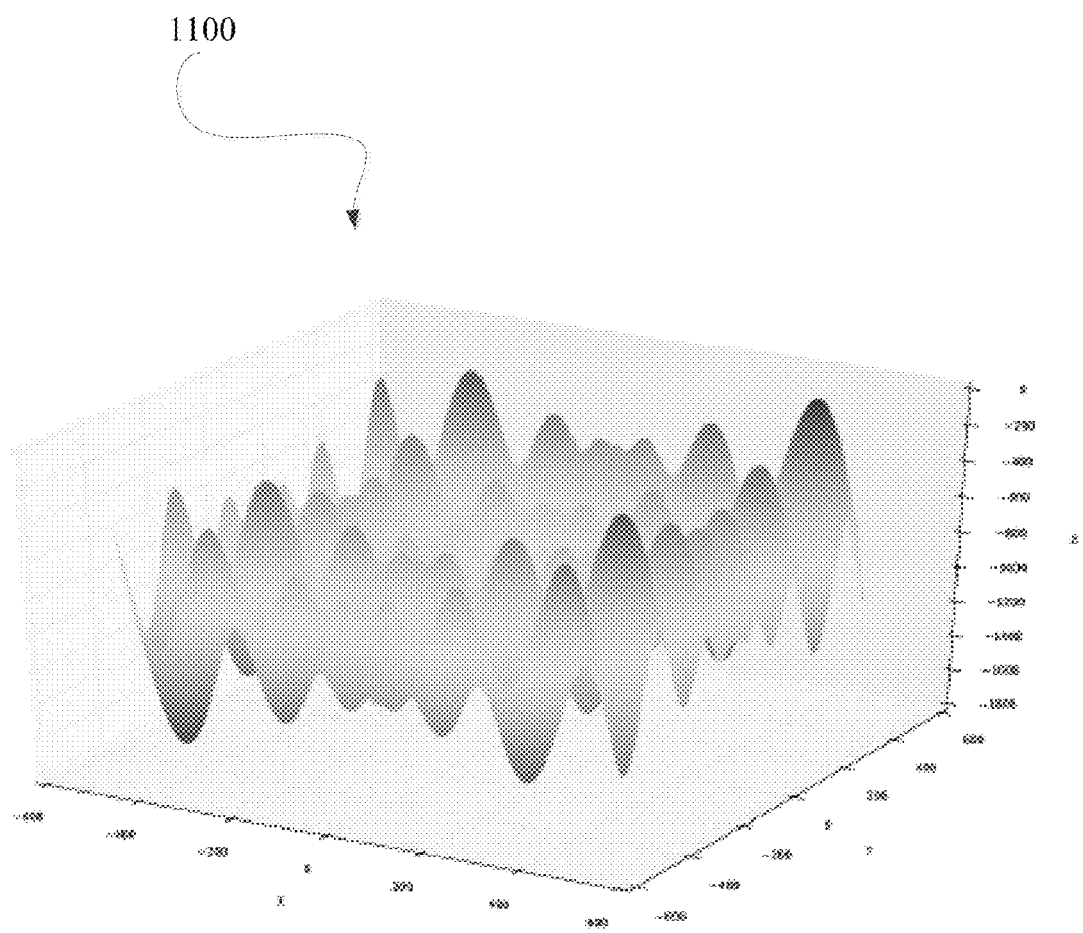
FIG. 11A depicts an exemplary illustration of Schwefel's function.

FIG. 11A depicts an exemplary Schwefel's function 1100 that exhibits no guiding slope towards the global optimum, which is located close to the border at $x_i = 420.9687$. Schwefel's function can be expressed as:

$$f(x) = -418.9829n - \sum_{i}^{n} \begin{cases} -x_i \cdot \sin\left(\sqrt{|x_i|}\right) & \text{if } -500 \leq x_i \leq 500 \\ 0.02 \cdot x_i^2 & \text{else} \end{cases} \quad (11)$$

and does not exhibit a guiding slope which could point in the direction of the global optimum. In addition, the global optimum is located close to the border of the search space $-500 \leq x_i \leq 500$ and the function is less symmetric than the previously described Ackley's function and Rastrigin's function. Accordingly, for the Schwefel's function, the optimization process is complicated because the average distance of the randomly placed individuals of the first generation to the optimum is greater than for a centered global optimum.

Figure 11B:
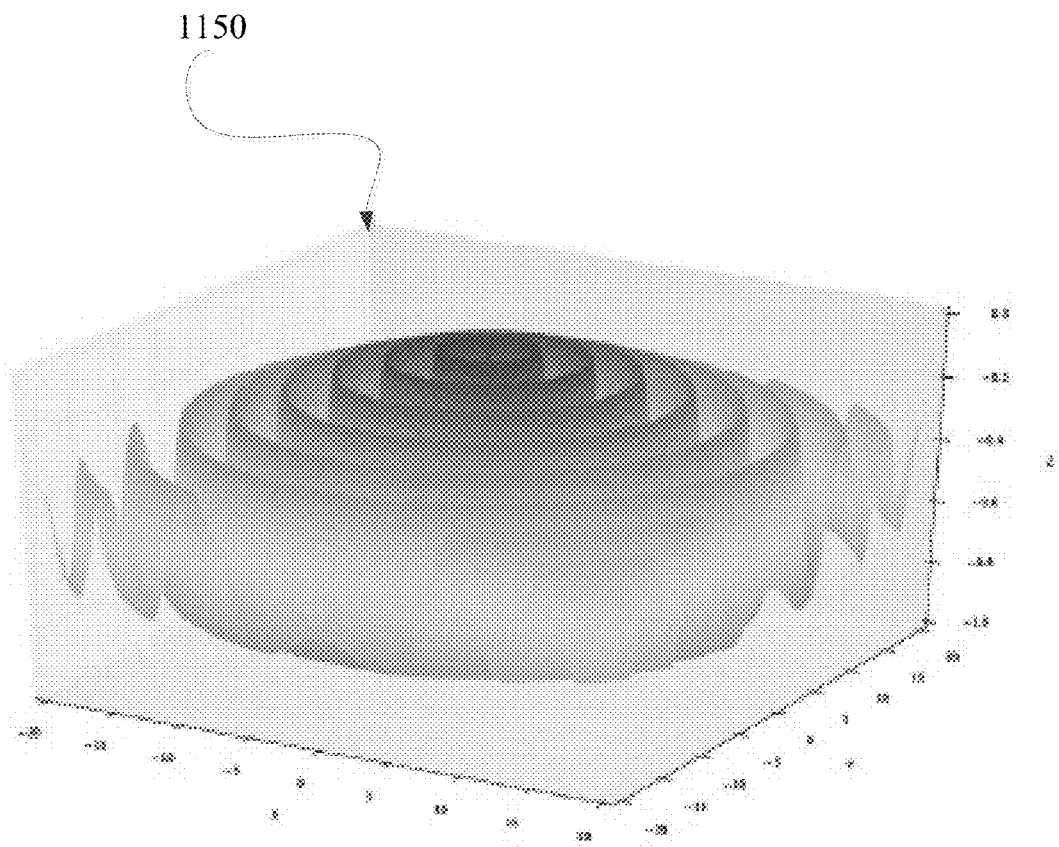
FIG. 11B depicts an exemplary illustration of Schaffer's F6 function.

FIG. 11B depicts an exemplary Schaffer's F6 function 1150. The difficulty in optimizing Schaffer's F6 function lies in the fact that the function value of the local optima increases toward the global optimum. Furthermore, the local optima of an n dimensional Schaffer's F6 function are n−1 dimensional, which complicates a successful deflation.

Schaffer's F6 function is expressed as:

$$f(x) = -(0.5) - \frac{\sin^2\left(\sqrt{\sum_{i=1}^{n} x_i^2}\right) - 0.5}{\left(1 + 0.001\left(\sqrt{\sum_{i=1}^{n} x_i^2}\right)\right)^2} \quad (12)$$

The function represents a special challenge for the HGDN optimization scheme of the present disclosure, as the n dimensional Schaffer's F6 function shows local optima that are n−1 dimensional. The search space for this function is chosen to be in the range $-20 \leq x_i \leq 20$. An infinite number of deflations are necessary to deflate a n−1 dimensional optimum entirely, which poses a challenge for the HGDN scheme. Another challenge lies is the increasing amplitude of the function, which has to be overcome to reach the global optimum.

By one embodiment, in most inversion problems, the forward modeling step is the most costly step (i.e., the processing time is large). Therefore, it is desirable to minimize the number of function evaluations necessary to optimize a function. Furthermore, the necessary gradient/Hessian computations have a large impact on the computational performance and therefore, need to be minimized. The performance of the HGDN optimization scheme is compared to a genetic algorithm and the hybrid Genetic-Newton method. The three methods were evaluated in finding the global optimum of the above described functions.

All experiments were executed 50 times, with a random starting population and optimized conditions. Furthermore, the performances of the three algorithms were sorted with respect to the number of function evaluations. The breaking condition for each algorithm corresponded to reaching the global optimum. The number of starting individuals are depicted below in Table 1. The number of starting individuals is chosen in order to guarantee the convergence in most cases to allow for a fair comparison. The performance of the three techniques were compared in finding the global optimum of the above described functions in two dimensions (represented as 2d), as well as finding the global optima of the functions in ten dimensions (represented as 10d). Note however, that the genetic algorithm was not applied to the ten dimensional case because of the superiority of the Genetic-Newton and the modified hybrid optimization scheme of the present disclosure (referred to hereinafter as HGDN) in the two dimensional case. Furthermore, the high number of individuals required to execute the genetic algorithm, renders the genetic algorithm uncompetitive in ten dimensions.

TABLE 1 comparison of number of starting individuals for the optimization schemes for 2d and 10d functions, respectively.

|  | Ackley | Rastrigin | Schwefel | Schaffer F6 |
| --- | --- | --- | --- | --- |
| Genetic 2d | 20 | 200 | 200 | 200 |
| Genetic-Newton 2d | 20 | 50 | 20 | 10 |
| HGDN 2d | 20 | 40 | 20 | 10 |
| Genetic-Newton 10d | 200 | 50 | 20 | 10 |
| HGDN 10d | 20 | 40 | 20 | 10 |

Figure 12:
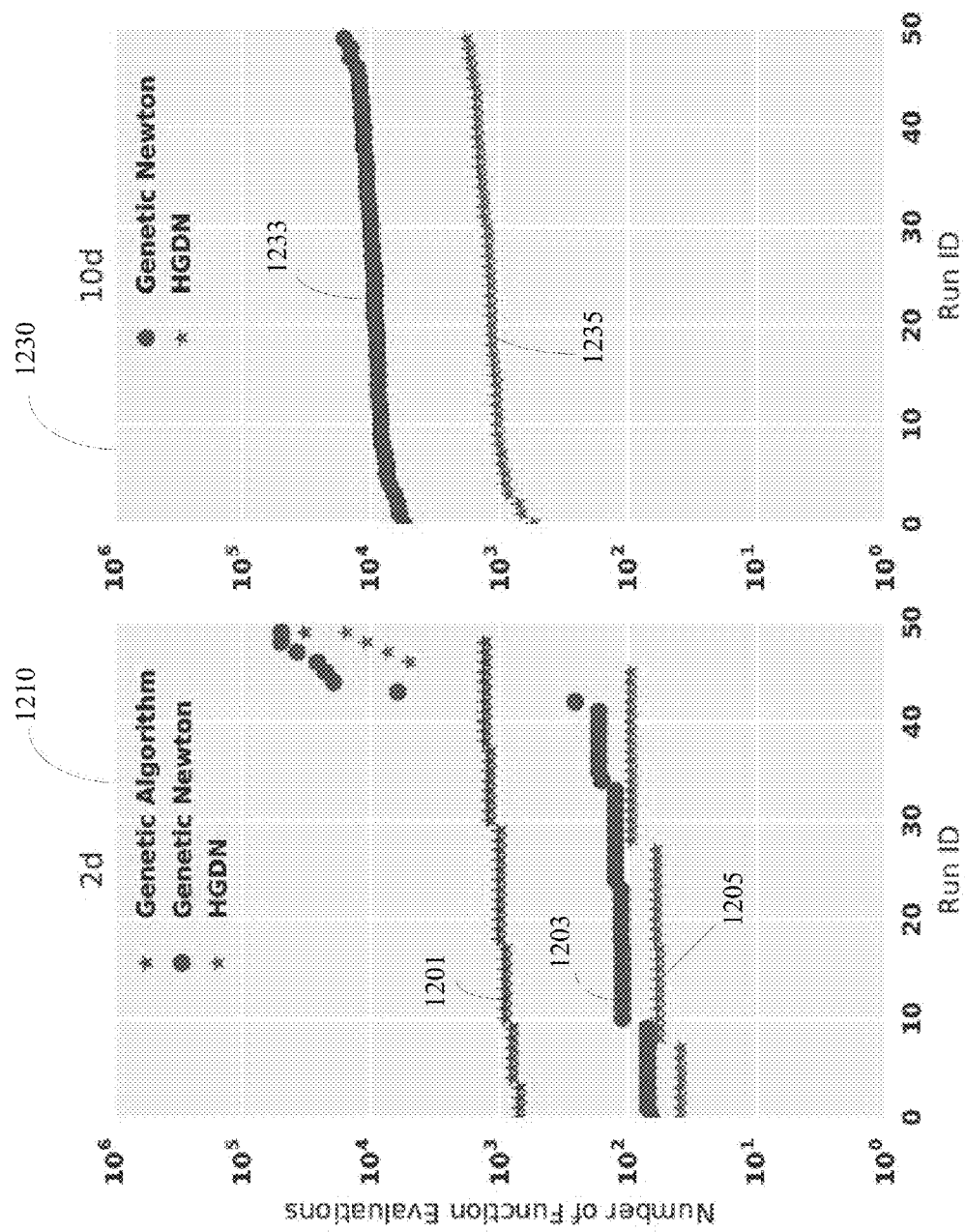
FIG. 12 depicts graphs illustrating a number of function evaluations performed for a two dimensional and ten dimensional Ackley's function.

The number of function evaluations required to optimize the Ackley's function (FIG. 9) are depicted in FIG. 12 and Tables 2 and 3. FIG. 12 depicts the performance comparison in finding the global optima for the Ackley's function by the genetic algorithm, the Genetic-Newton algorithm, and the HGDN algorithm. Specifically, in FIG. 12, graph 1210 depicts the comparison of the optimization algorithms for the two-dimensional functions, and graph 1230 depicts the performance comparison for the ten-dimensional function.

By one embodiment, the number of function evaluations for the two and ten dimensional representation of the Ackley's function are performed for 50 optimization runs. Referring to graph 1210, the genetic algorithm (depicted by curve 1201) is outperformed by the Genetic-Newton (curve 1203), and the HGDN algorithm (curve 1205) for the two-dimensional function case. For the case of having the function being represented in ten dimensions, referring to graph 1230, the HGDN algorithm (curve 1235) optimizes Ackley's function in fewer function evaluations than the Genetic-Newton algorithm (curve 1233).

TABLE 2 means and variances of 50 iterations using Ackley's function in two dimensions.

| Method | Func.Eval. | σ Func. Eval | Grad/H.Comp | σ Grad./ H. Comp. |
| --- | --- | --- | --- | --- |
| Genetic Alg. | 1670.0 | 4451.5 | 0 | 0 |
| Genetic-Newton | 4354.5 | 11932.7 | 12695.3 | 34830.1 |
| HGDN | 845.8 | 2865.3 | 6308.0 | 21669.2 |

TABLE 3 means and variances of 50 iterations using Ackley's function in ten dimensions.

| Method | Func.Eval. | σ Func. Eval | Grad/H.Comp | σ Grad./ H. Comp. |
| --- | --- | --- | --- | --- |
| Genetic-Newton | 9820.0 | 2115.2 | 36163.1 | 7452.5 |
| HGDN | 1221.2 | 268.4 | 7962.3 | 1736.2 |

Referring to the Ackley's function as depicted in FIG. 9, the guiding slope leads to a fast convergence of the genetic algorithm into the global optimum. Since the local gradient is not used in the genetic algorithm, the local optima cannot degrade the convergence rate. The guiding slope, on the other hand, is used implicitly. The hybrid methods use the local gradient which degenerates convergence. The small wavelength structure of the function misleads the methods that use local gradient information. However, it must be appreciated that the HGDN method depicts a fast convergence towards the global optimum as shown in FIG. 12.

Figure 13:
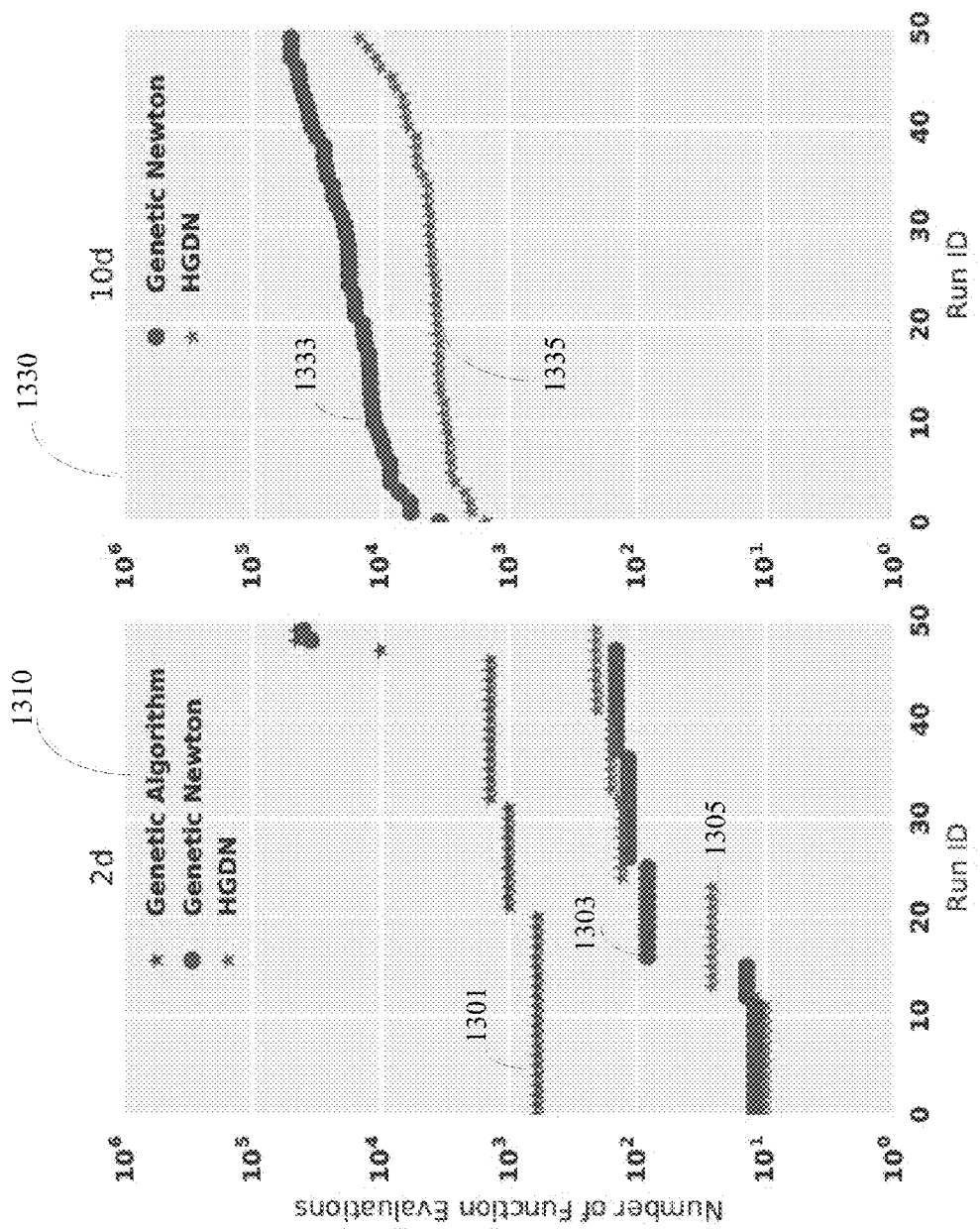
FIG. 13 depicts graphs illustrating a number of function evaluations performed for a two dimensional and ten dimensional Rastrigin's function.

By one embodiment, Rastrigin's function does not show a steep guiding slope, which leads to more function evaluations for the genetic algorithm. The HGDN method outperforms its opponents when optimizing Rastrigin's function as shown in FIG. 13. Referring to graph 1310 of FIG. 13, the genetic algorithm (depicted by curve 1301) is outperformed by the Genetic-Newton (curve 1303), and the HGDN algorithm (curve 1305) for the two-dimensional function case. For the case of having the function being represented in ten dimensions, referring to graph 1330, the HGDN algorithm (curve 1335) optimizes Rastrigin's function in fewer function evaluations than the Genetic-Newton algorithm (curve 1333). The number of function evaluations of Rastrigin's function in two and ten dimensions as depicted in FIG. 13 are performed for 50 optimization runs. Both hybrid methods (Genetic-Newton and the HGDN) perform well optimizing Rastrigin's function in two and ten dimensions. Referring to graph 1330 of FIG. 13, the HGDN (curve 1335) performs better (as compared to genetic-Newton, represented by curve 1333) because it avoids frequent convergence in one of the many local optima.

TABLE 4 means and variances of 50 iterations using Rastrigin's function in two dimensions.

| Method | Func.Eval. | $\sigma$ Func. Eval | Grad/H.Comp | $\sigma$ Grad./ H. Comp. |
|---|---|---|---|---|
| Genetic Alg. | 2908.0 | 8772.1 | 0 | 0 |
| Genetic-Newton | 1578.7 | 7353.0 | 4384.8 | 19954.1 |
| HGDN | 94.9 | 78.1 | 769.8 | 691.3 |

TABLE 5 means and variances of 50 iterations using Rastrigin's function in ten dimensions.

| Method | Func.Eval. | $\sigma$ Func. Eval | Grad/H.Comp | $\sigma$ Grad./ H. Comp. |
|---|---|---|---|---|
| Genetic-Newton | 20856.5 | 12712.8 | 70892.2 | 43082.6 |
| HGDN | 4677.5 | 2609.0 | 27766.5 | 14085.6 |

Figure 14:
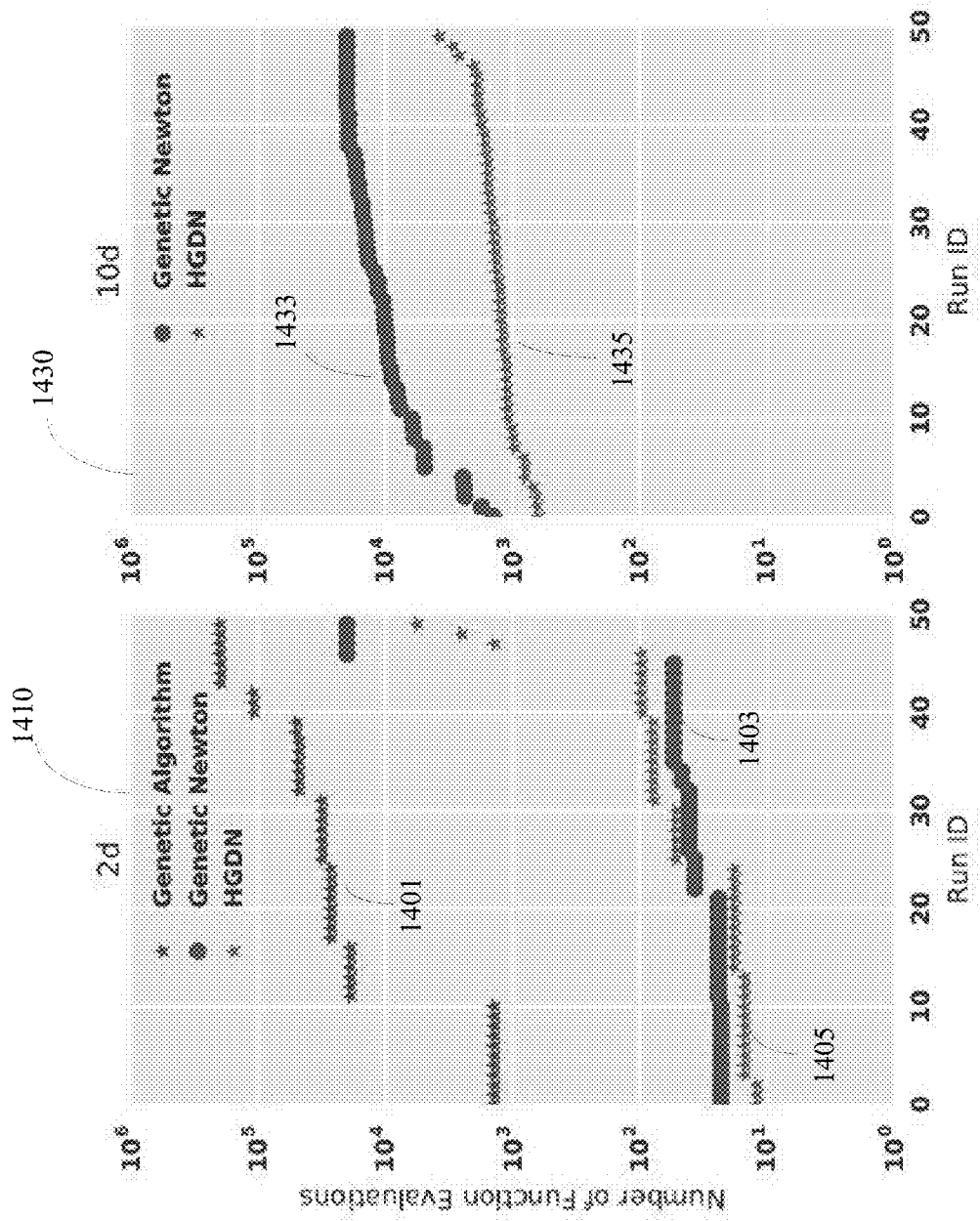
FIG. 14 depicts graphs illustrating a number of function evaluations performed for a two dimensional and ten dimensional Schwefel's function.

By one embodiment, the Schwefel's function (FIG. 11) is more difficult to optimize due to the missing guiding slope, the missing symmetry, and the non-centered optimum. The number of function evaluations for Schwefel's function represented in two and ten dimensions, is performed for 50 optimization runs. Referring to graph 1410 of FIG. 14, the Genetic algorithm (depicted by curve 1401) is outperformed by the Genetic-Newton (curve 1403), and the HGDN algorithm (curve 1405) for the two-dimensional function case. For the case of having the function being represented in ten dimensions, referring to graph 1430, the HGDN algorithm (curve 1435) optimizes Schwefel's function in substantially fewer function evaluations than the Genetic-Newton algorithm (curve 1433). Tables 6 and 7 depicted below illustrate the means and variances of the 50 optimization iterations performed on the Schwefel's function.

TABLE 6 means and variances of 50 iterations using Schwefel's function in two dimensions.

| Method | Func.Eval. | $\sigma$ Func. Eval | Grad/H.Comp | $\sigma$ Grad./ H. Comp. |
|---|---|---|---|---|
| Genetic Alg. | 53400.0 | 63925.8 | 0 | 0 |
| Genetic-Newton | 1636.0 | 5427.1 | 7049.1 | 22575.3 |
| HGDN | 232.0 | 860.2 | 6557.7 | 26279.9 |

TABLE 7 means and variances of 50 iterations using Schwefel's function in ten dimensions.

| Method | Func.Eval. | $\sigma$ Func. Eval | Grad/H.Comp | $\sigma$ Grad./ H. Comp. |
|---|---|---|---|---|
| Genetic-Newton | 12254.7 | 5908.6 | 162648.1 | 76878.9 |
| HGDN | 1408.7 | 566.4 | 34540.1 | 14329.3 |

The HGDN method of the present disclosure outperforms the genetic and Genetic-Newton methods of optimizing the Schwefel's function. In the two dimensional case, Genetic-Newton also converges fast towards the global optimum. In ten dimensions the Genetic-Newton is clearly outperformed by the HGDN method.

Figure 15:
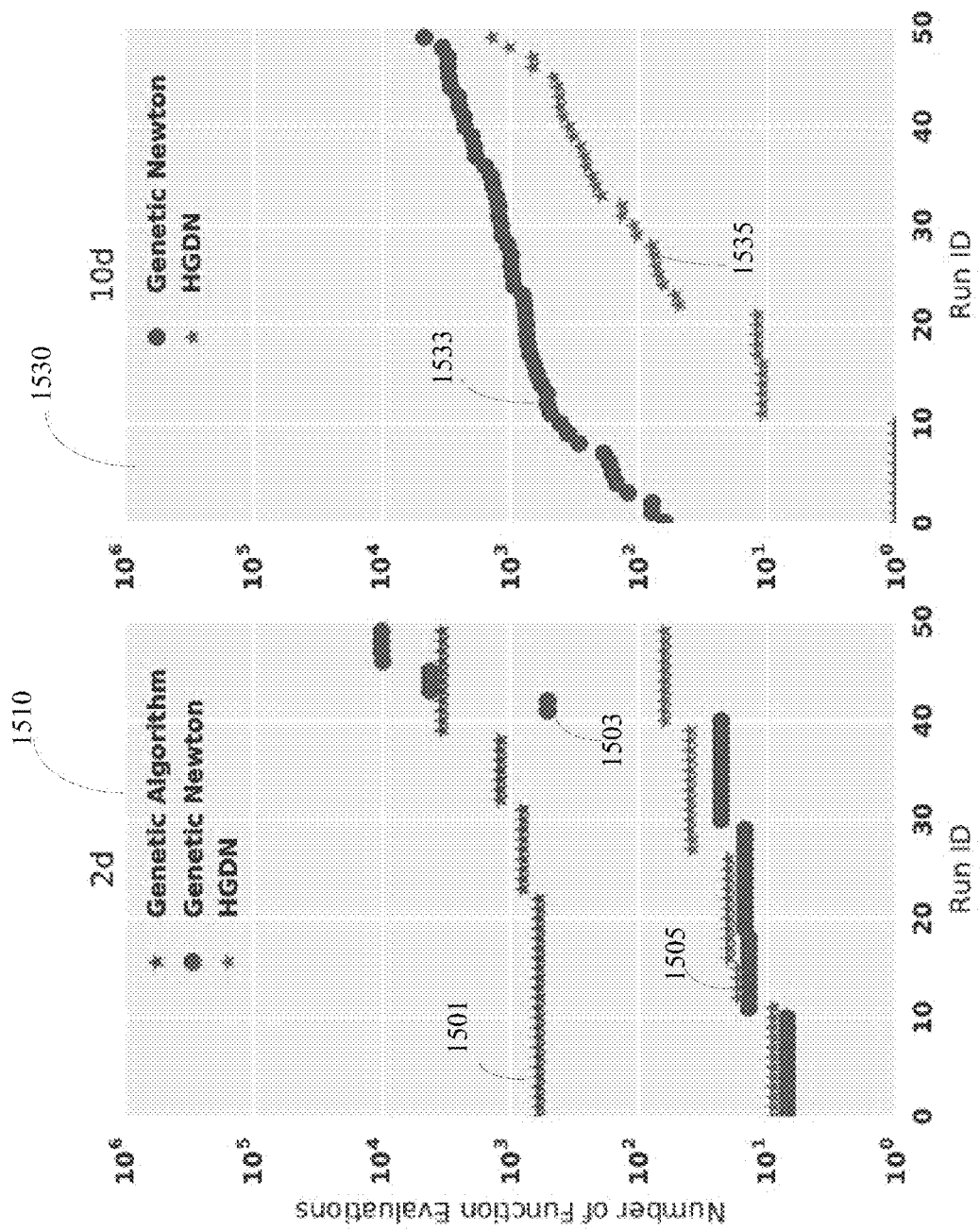
FIG. 15 depicts graphs illustrating a number of function evaluations performed for a two dimensional and ten dimensional Schaffer's F6 function.

By one embodiment, the Schaffer's F6 function poses the problem of n−1 dimensional local optima. Nevertheless, the HGDN approach outperforms its opponents, as seen in FIG. 15. FIG. 15 depicts the performance comparison in finding the global optima for the Schaffer's F6 function by the genetic algorithm, the Genetic-Newton algorithm, and the HGDN algorithm. Specifically, in FIG. 15, graph 1510 depicts the comparison of the optimization algorithms for the two-dimensional functions, and graph 1530 depicts the performance comparison for the ten-dimensional function.

Referring to graph 1510, the genetic algorithm (depicted by curve 1501) is outperformed by the Genetic-Newton (curve 1503), and the HGDN algorithm (curve 1505) for the two-dimensional function case. For the case of having the function being represented in ten dimensions, referring to graph 1530, the HGDN algorithm (curve 1535) optimizes Schaffer's F6 function in fewer function evaluations than the Genetic-Newton algorithm (curve 1533). The number of function evaluations of Schaffer's F6 function in two and ten dimensions are presented for 50 optimization runs. It must be appreciated that despite difficulties linked to the shape of the optima, the improvement in the number of function evaluations used for optimizing Schaffer's F6 function is significant compared with the two competing methods. Tables 8 and 9 depicted below illustrate the means and variances of the 50 optimization runs performed on the Schaffer's F6 function.

TABLE 8 means and variances of 50 iterations using Schaffer's F6 function in two dimensions.

| Method | Func.Eval. | $\sigma$ Func. Eval | Grad/H.Comp | $\sigma$ Grad./ H. Comp. |
|---|---|---|---|---|
| Genetic Alg. | 1336.0 | 1113.9 | 0 | 0 |
| Genetic-Newton | 1082.8 | 2803.6 | 3923.4 | 9956.5 |
| HGDN | 30.88 | 19.6 | 252.2 | 195.2 |

TABLE 9 means and variances of 50 iterations using Schaffer's F6 function in ten dimensions.

| Method | $\overline{\text{Func.Eval.}}$ | σ Func. Eval | $\overline{\text{Grad/H.Comp}}$ | σ Grad./ H. Comp. |
|---|---|---|---|---|
| Genetic-Newton | 1231.4 | 1028.1 | 4824.7 | 3954.7 |
| HGDN | 181.5 | 275.9 | 1109.2 | 1577.6 |

By one embodiment, in times where processing units are becoming rather cheaper than faster, it is important for an optimization technique to take advantage of parallel computer architectures. The HGDN approach offers an inherent possibility to be parallelized, since every individual can search for a local optimum independently. By one embodiment, in the current implementation, this may be achieved by using OpenMP to parallelize the loop over all individuals as described with reference to FIG. 5.

The numerical experiments described above suggest that the HGDN method outperforms the two competing methods in most situations by a significant amount of function and derivative evaluations. The numerical experiments described above suggest that the HGDN method outperforms the two competing methods in most situations by a significant amount of function and derivative evaluations. FIG. 12 depicts the number of function evaluations to optimize Ackley's function. The superiority of the HGDN algorithm is more apparent in the ten dimensional case. It has to be stated here, that in the optimization of Ackley's and Rastrigin's function, the Genetic-Newton algorithm needed more individuals to guarantee the convergence. Using the same number of individuals for all competing algorithms leads to many runs of the Genetic and the Genetic-Newton algorithm not converging to the global optimum within a given allowed maximum number of genetic steps. The HGDN method, on the other hand, needs fewer individuals to converge. The highly non-linear short wavelength structure of Ackley's function poses a problem for the general hybrid methods, which leads to a high number of function and gradient evaluations.

Rastrigin's function (FIG. 10) was optimized reliably and efficiently by both hybrid algorithms. However, the HGDN method outperforms its opponents which is more apparent in ten dimensions than in two dimensions.

The performance of the HGDN method when optimizing Schwefel's function (FIG. 11A) is of particular importance because of the relevance for real life optimization problems. The HGDN method maintains its superiority over its two components. Again, the performance gain compared to the Genetic-Newton method is especially apparent in ten dimensions.

The Schaffer's F6 function (FIG. 11B) represents a special challenge for the HGDN method since the null space of the Hessian is not zero dimensional at the local optima. Therefore, the optima may not be entirely deflated by the deflation operations. However, even in this special case, the HGDN method performs better than the other tested methods.

Accordingly, the HGDN method leads to significant performance gain as compared to other tested methods. It is important to note that the superiority of the HGDN method benefits from higher dimensions of the search space. The improvements incurred in reducing the number of function and derivative evaluations to optimize a function potentially have a large impact on many fields in research and industry.

For instance, by one embodiment, the technique of HGDN optimization as described above can be applied in medical image registration problems.

Image registration is a technique that is used in applications such as medical image processing, face recognition, object flow and tracking, and the like. The objective herein is to minimize a difference between two images and produce the best transformation to match a deformed image to a reference image. In order to compute the transformation, optimization is required. In the case of a 2D-2D image registration, given an original image, and a deformed image, the task is to determine, whether the deformed image represents the subject depicted in the original image. In such a case, one seeks to find an optimal transformation that can spatially align the two images, such that the deformed image could be warped back to the referenced image.

The process of finding an optimal transformation could be very expensive, which is a disadvantage for many applications. Additionally, some clinical processes such as brain shift estimation based on intra-operatively acquired ultrasound require almost real-time registration. Accordingly, since the HGDN optimization technique reduces the number of function evaluations and derivative operations, the technique can be applied for real time image registration purposes.

Figure 16:
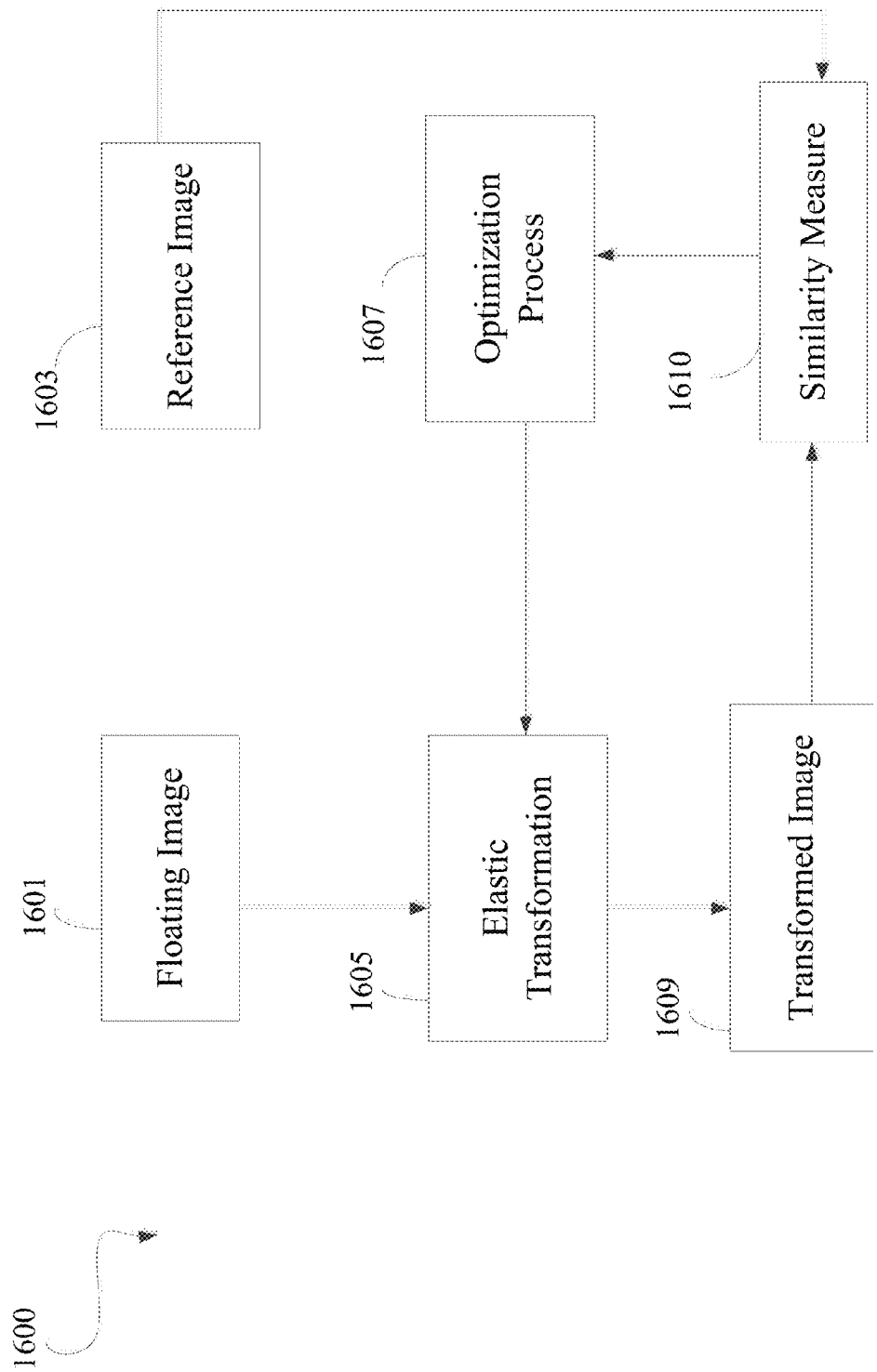
FIG. 16 illustrates an exemplary schematic flowchart depicting the steps performed in image registration.

Turning to FIG. 16, there is illustrated an exemplary schematic flowchart depicting the steps performed in an image registration process. Specifically, FIG. 16 depicts an exemplary elastic image registration process 1600. According to an embodiment, the process of elastic image registration can be divided into three separate sub-processes: image transformation, image similarity computation, and optimization of image similarity. Elastic image registration is applicable in CT or MRI applications, wherein the elastic image registration process improves matching accuracy, by provisioning for any changes in the anatomy during surgery, since the CT or MRI images were taken. Specifically, the elastic registration process warps the CT or MRI image to match the shape of the anatomy represented by a current ultrasound frame, and thus provides a higher-quality image to be used as a guide for surgery.

Referring to FIG. 16, the images to be aligned are a floating image 1601, and a reference image 1603. A goal of the registration process 1600 is to find a transformation 1605 that best aligns the voxels in the floating image to the voxels in the reference image. The image transformation 1605 maps the voxels in the floating image to the voxels in the reference image. It must be appreciated that the image transformation sub-process may be performed by techniques including, but not limited to, image transformation using a physical model, image transformation based on basis functions, and the like. The floating image 1601 is converted into a transformed image 1609 via the elastic image transformation sub-process.

An image similarity measure 1610 is a numerical value that indicates the degree of misalignment between the images (transformed image 1609, and the reference image 1603). Specifically, for sake of illustration, considering that the images to be aligned are referred to as the reference image (RI) and the floating image (FI), a transformation represented as T is applied to the voxels of the floating image. Further, an image similarity measure is applied to the region of overlap of the reference image and the floating image, and is defined herein as: $X_o = \{x_0 : x_0 \in RI \cap T(FI)\}$.

The voxel intensities in a position within the reference and the floating image are denoted as RI $(x_o)$ and FI $(x_o)$, and their respective sets are referred to as RI $(X_o)$ and FI $(X_o)$.

Accordingly, a difference image can be generated as follows:
$D=\{\{d(x_o)=RI(x_o)-FI(x_o):x_o \in X_o\}\}$.

An optimization algorithm 1607 is employed in an iterative manner, to find the optimal image similarity measure over the whole set of possible transformations. By one embodiment, the optimization algorithms described previously with reference to FIG. 4 and FIG. 5 can be utilized to find the transformation parameters that maximize image similarity. By one embodiment, the algorithms of FIG. 4 and FIG. 5 described previously can be employed to minimize a mean square difference between the transformed image and the reference image to obtain the optimal similarity measure.

Furthermore, medical image registration processes require an optimization sub-process that incurs a low number of function evaluation operations. In the case of image registration, the function to be maximized is the voxel similarity function. Since calculation of image similarity incurs a high computational cost, it is highly desirable that the optimization algorithm requires the least possible number of function evaluations to converge. Moreover, the optimization sub-process requires the ability to recover from convergence in local optima. In other words, it is advantageous to have an optimization algorithm that avoids convergence in local extrema of the image similarity function. As stated previously, the HGDN method of FIG. 4 and FIG. 5 is well suited for such applications, as it reduces the number of evaluations and derivative operations that are to be performed in the optimization sub-process and also avoids convergence to local optima by implementing a deflation operation.

Additionally, the HGDN optimization technique can be applied to a 2D-3D and 3D-3D ultrasound (US) registration and fusion process. Such a process generally incurs challenges in the optimization phase due to a low signal-to-noise ratio. In such US registration, the three key steps that need to be performed are: definition of a search space, (2) selection of a similarity measure, and (3) choice of an optimization approach. In the US registration technique, the global optima (e.g., global maxima) of similarity function correspond to a correct registration. Accordingly, the HGDN technique as described by the embodiments above may be utilized in such a scenario to compute the local and global optima of the similarity function.

Moreover, the HGDN method is well suited to be utilized for solving optimization problems in applications such as medical image registration, as it provides the advantageous ability of computing many local and the global optimum.

In contrast, a pure newton method only finds one optimum, i.e., local or global optima. A typical genetic algorithm computes one optimum, which is hopefully the global optimum. As described previously, the HGDN technique finds and removes the optima to be stored in a list of a predetermined length. In this manner, the HGDN technique computes, not only one global optimum, but several local ones as well. Knowledge of local optima may be beneficial as they may be located substantially close to the global optima.

It must be appreciated that the optimization technique described herein is in no way limited to be applied only in the above described medical image-registration scenario. Rather, the optimization technique described by the embodiments is equally applicable in digital image processing areas such as formulating an optimal design of engineering parts in the aerospace industry, earthquake source detection and characterization in seismic CT applications (wherein the seismic image is obtained via seismic exploration or monitoring), optimizing weather prediction models, impedance matching optimization in electrical circuits, and the like.

Thus, the HGDN optimization technique of the present disclosure finds applications in a broad range of technical fields, and moreover improves the function of a computer (which includes circuitry that is configured to execute the method) by reducing the number of evaluations and derivative operations that need to be performed.

Each of the functions of the described embodiments may be implemented by one or more processing circuits. A processing circuit includes a programmed processor (for example, processor 1703 in FIG. 17), as a processor includes circuitry. A processing circuit also includes devices such as an application-specific integrated circuit (ASIC) and circuit components that are arranged to perform the recited functions.

Figure 17:
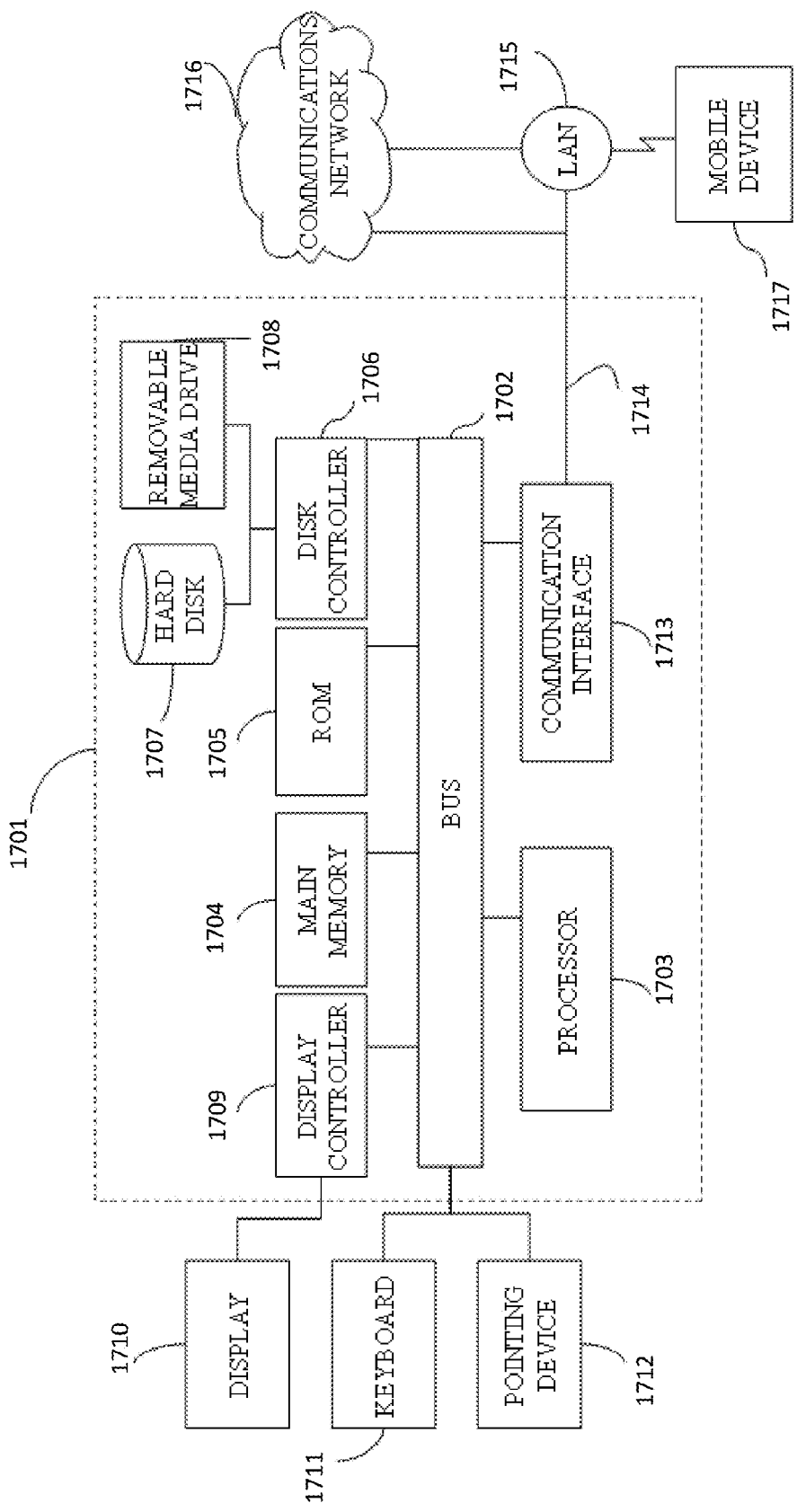
FIG. 17 illustrates a block diagram of a computing device according to one embodiment.

The various features discussed above may be implemented by a computer system (or programmable logic). FIG. 17 illustrates such a computer system 1701. In one embodiment, the computer system 1701 is a particular, special-purpose machine when the processor 1703 is programmed to perform the estimate computations and other functions described above.

The computer system 1701 includes a disk controller 1706 coupled to the bus 902 to control one or more storage devices for storing information and instructions, such as a magnetic hard disk 1707, and a removable media drive 1708 (e.g., floppy disk drive, read-only compact disc drive, read/write compact disc drive, compact disc jukebox, tape drive, and removable magneto-optical drive). The storage devices may be added to the computer system 1701 using an appropriate device interface (e.g., small computer system interface (SCSI), integrated device electronics (IDE), enhanced-IDE (E-IDE), direct memory access (DMA), or ultra-DMA).

The computer system 1701 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1701 may also include a display controller 1709 coupled to the bus 1702 to control a display 1710, for displaying information to a computer user. The computer system includes input devices, such as a keyboard 1711 and a pointing device 1712, for interacting with a computer user and providing information to the processor 1703. The pointing device 1712, for example, may be a mouse, a trackball, a finger for a touch screen sensor, or a pointing stick for communicating direction information and command selections to the processor 1703 and for controlling cursor movement on the display 1710.

The processor 1703 executes one or more sequences of one or more instructions contained in a memory, such as the main memory 1704. Such instructions may be read into the main memory 1704 from another computer readable medium, such as a hard disk 1707 or a removable media drive 1708. One or more processors in a multi-processing arrangement may also be employed to execute the sequences of instructions contained in main memory 1704. In alternative embodiments, hard-wired circuitry may be used in place of or in combination with software instructions. Thus, embodiments are not limited to any specific combination of hardware circuitry and software.

As stated above, the computer system 1701 includes at least one computer readable medium or memory for holding instructions programmed according to any of the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 1701, for driving a device or devices for implementing the features of the present disclosure, and for enabling the computer system 1701 to interact with a human user. Such software may include, but is not limited to, device drivers, operating systems, and applications software. Such computer readable media further includes the computer program product of the present disclosure for performing all or a portion (if processing is distributed) of the processing performed in implementing any portion of the present disclosure.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 1703 for execution. A computer readable medium may take many forms, including but not limited to, non-volatile media or volatile media. Non-volatile media includes, for example, optical, magnetic disks, and magneto-optical disks, such as the hard disk 1707 or the removable media drive 1708. Volatile media includes dynamic memory, such as the main memory 1704. Transmission media, on the contrary, includes coaxial cables, copper wire and fiber optics, including the wires that make up the bus 1702. Transmission media also may also take the form of acoustic or light waves, such as those generated during radio wave and infrared data communications.

Various forms of computer readable media may be involved in carrying out one or more sequences of one or more instructions to processor 1703 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 1701 may receive the data on the telephone line and place the data on the bus 1702. The bus 1702 carries the data to the main memory 1704, from which the processor 1703 retrieves and executes the instructions. The instructions received by the main memory 1704 may optionally be stored on storage device 1707 or 1708 either before or after execution by processor 1703.

The computer system 1701 also includes a communication interface 1713 coupled to the bus 1702. The communication interface 1713 provides a two-way data communication coupling to a network link 1714 that is connected to, for example, a local area network (LAN) 1715, or to another communications network 1716 such as the Internet. For example, the communication interface 1713 may be a network interface card to attach to any packet switched LAN. As another example, the communication interface 1713 may be an integrated services digital network (ISDN) card. Wireless links may also be implemented. In any such implementation, the communication interface 1713 sends and receives electrical, electromagnetic or optical signals that carry digital data streams representing various types of information.

The network link 1714 typically provides data communication through one or more networks to other data devices. For example, the network link 1714 may provide a connection to another computer through a local network 1715 (e.g., a LAN) or through equipment operated by a service provider, which provides communication services through a communications network 1716. The local network 1714 and the communications network 1716 use, for example, electrical, electromagnetic, or optical signals that carry digital data streams, and the associated physical layer (e.g., CAT 5 cable, coaxial cable, optical fiber, etc.). The signals through the various networks and the signals on the network link 1714 and through the communication interface 1713, which carry the digital data to and from the computer system 1701 may be implemented in baseband signals, or carrier wave based signals.

The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1701 can transmit and receive data, including program code, through the network(s) 1715 and 1716, the network link 1714 and the communication interface 1713. Moreover, the network link 1714 may provide a connection through a LAN 1715 to a mobile device 1717 such as a personal digital assistant (PDA) laptop computer, or cellular telephone.

While aspects of the present disclosure have been described in conjunction with the specific embodiments thereof that are proposed as examples, alternatives, modifications, and variations to the examples may be made. It should be noted that, as used in the specification and the appended claims, the singular forms "a," "an," and "the" include plural referents unless the context clearly dictates otherwise

The invention claimed is:

1. An apparatus for performing digital image processing, the processing including computing optima of a function of the digital image, the apparatus comprising:
 circuitry configured to
  initialize a plurality of candidate points that lie in a solution space of the function, each candidate point being represented by a vector having a length equal to the dimension of the function,
  compute, based on the candidate points, one or more stationary points of the function,
  deflate a gradient of the function at each of the one or more computed stationary points,
  repeat the computing and the deflating until a first criteria is satisfied,
  select, from the one or more computed stationary points, a predetermined number of fit points,
  recombine the selected fit points to generate a set of new candidate points, repeat, for the set of new candidate points, the computing, the deflating, the first repeating, the selecting, and the recombining, until a second criteria is satisfied, obtain, the optima of the function upon the second criteria being satisfied, and process the digital image based on the obtained optima.

2. The apparatus of claim 1, wherein each of the one or more computed stationary points of the function is a point where a first derivative of the function is zero.

3. The apparatus of claim 1, wherein the function is non-linear and twice continuously differentiable.

4. The apparatus of claim 1, wherein the circuitry is further configured to deflate the gradient of the function by computing a numerical factorization of the gradient based on a bump function.

5. The apparatus of claim 4, wherein the bump function includes a shaping parameter configured to adjust the shape of a deflation at each of the one or more computed stationary points.

6. The apparatus of claim 1, wherein the circuitry is further configured to select the predetermined number of fit points based on a fitness score computed for each of the one or more stationary points, and wherein the predetermined number of fit points is less than the one or more computed stationary points.

7. The apparatus of claim 1, wherein the first criteria corresponds to no new stationary points being computed by the circuitry, and the second criteria corresponds to a change in fitness score of the selected fit points not exceeding a predetermined threshold value.

8. The apparatus of claim 1, wherein the digital image is a medical image and the circuitry is further configured to register the medical image based on the obtained optima.

9. The apparatus of claim 1, wherein the digital image is a seismic image and the circuitry is further configured to detect an earthquake source based on the obtained optima.

10. A method for performing digital image processing, the processing including computing optima of a function of the digital image, the method comprising:

initializing a plurality of candidate points that lie in a solution space of the function, each candidate point being represented by a vector having a length equal to the dimension of the function;

computing by circuitry, based on the candidate points, one or more stationary points of the function;

deflating a gradient of the function at each of the one or more computed stationary points;

repeating the computing and the deflating until a first criteria is satisfied;

selecting, from the one or more computed stationary points, a predetermined number of fit points;

recombining by circuitry, the selected fit points to generate a set of new candidate points;

repeating, for the set of new candidate points, the computing, the deflating, the first repeating, the selecting, and the recombining, until a second criteria is satisfied;

obtaining, the optima of the function upon the second criteria being satisfied; and processing by circuitry, the digital image based on the obtained optima.

11. The method of claim 10, wherein each of the one or more computed stationary points of the function is a point where a first derivative of the function is zero.

12. The method of claim 10, wherein the function is non-linear and twice continuously differentiable.

13. The method of claim 10, further comprising:
deflating the gradient of the function by computing a numerical factorization of the gradient based on a bump function.

14. The method of claim 13, wherein the bump function includes a shaping parameter configured to adjust the shape of a deflation at each of the one or more computed stationary points.

15. The method of claim 10, further comprising:
selecting the predetermined number of fit points based on a fitness score computed for each of the one or more stationary points, and wherein the predetermined number of fit points is less than the one or more computed stationary points.

16. The method of claim 10, wherein the first criteria corresponds to no new stationary points being computed by the circuitry, and the second criteria corresponds to a change in fitness score of the selected fit points not exceeding a predetermined threshold value.

17. The method of claim 10, wherein the digital image is a medical image and the method further comprises registering the medical image based on the obtained optima.

18. The method of claim 10, wherein the digital image is a seismic image and the method further comprises detecting an earthquake source based on the obtained optima.

19. A non-transitory computer readable medium having stored thereon a program that when executed by a computer, causes the computer to execute a method for performing digital image processing, the processing including computing optima of a function of the digital image, the method comprising:

initializing a plurality of candidate points that lie in a solution space of the function, each candidate point being represented by a vector having a length equal to the dimension of the function;

computing based on the candidate points, one or more stationary points of the function;

deflating a gradient of the function at each of the one or more computed stationary points;

repeating the computing and the deflating until a first criteria is satisfied;

selecting, from the one or more computed stationary points, a predetermined number of fit points;

recombining the selected fit points to generate a set of new candidate points;

repeating, for the set of new candidate points, the computing, the deflating, the first repeating, the selecting, and the recombining, until a second criteria is satisfied;

obtaining, the optima of the function upon the second criteria being satisfied; and processing the digital image based on the obtained optima.

20. The non-transitory computer readable medium of claim 19, wherein each of the one or more computed stationary points of the function is a point where a first derivative of the function is zero, and wherein the function is non-linear and is twice continuously differentiable.

21. The non-transitory computer readable medium of claim 19, the method further comprising:
deflating the gradient of the function by computing a numerical factorization of the gradient based on a bump function.

22. The non-transitory computer readable medium of claim 21, wherein the bump function includes a shaping parameter configured to adjust the shape of a deflation at each of the one or more computed stationary points.

23. The non-transitory computer readable medium of claim 19, the method further comprising:

selecting the predetermined number of fit points based on a fitness score computed for each of the one or more stationary points, and wherein the predetermined number of fit points is less than the one or more computed stationary points.

24. The non-transitory computer readable medium of claim 19, wherein the first criteria corresponds to no new stationary points being computed by the circuitry, and the second criteria corresponds to a change in fitness score of the selected fit points not exceeding a predetermined threshold value.

25. The non-transitory computer readable medium of claim 19, wherein the digital image is a medical image and the method further comprises registering the medical image based on the obtained optima.

26. The non-transitory computer readable medium of claim 19, wherein the digital image is a seismic image and the method further comprises detecting an earthquake source based on the obtained optima.

* * * * *